United States Patent
Naiki et al.

[11] Patent Number: 5,815,301
[45] Date of Patent: Sep. 29, 1998

[54] SCANNING OPTICAL APPARATUS

[75] Inventors: Toshio Naiki; Akiyoshi Hamada; Yoshihiro Inagaki, all of Toyokawa, Japan

[73] Assignee: Minolta Co., Ltd., Osaka, Japan

[21] Appl. No.: 633,377

[22] Filed: Apr. 17, 1996

[30] Foreign Application Priority Data

Apr. 21, 1995 [JP] Japan ..................................... 7-096627
Apr. 21, 1995 [JP] Japan ..................................... 7-097095

[51] Int. Cl.$^6$ .................................................. G02B 26/08
[52] U.S. Cl. .......................... 359/205; 359/207; 359/212; 359/216
[58] Field of Search .................................... 359/205–207, 359/212–219, 662, 710, 784; 347/258–261

[56] References Cited

U.S. PATENT DOCUMENTS 5,148,190  9/1992  Iizuka .

FOREIGN PATENT DOCUMENTS 59-034512 A  2/1984  Japan .
6-11657  1/1994  Japan ..................................... 359/204

*Primary Examiner*—James Phan
*Attorney, Agent, or Firm*—Burns, Doane, Swecker & Mathis, LLP

[57] ABSTRACT

A scanning optical apparatus for a printer and a digital copying machine has a light source, a deflector, first and second imaging units. The deflector deflects a light beam emitted from the light source to a main scanning direction. The first imaging unit makes the light beam emitted from the light source form an image in the vicinity of the deflection position of said deflector in the sub-scanning direction. The first imaging unit has a first resin lens having a negative refractive power only in a sub-scanning direction. The second imaging unit makes the light beam deflected by the deflector form an image on a scanned surface in the sub-scanning direction. The second imaging unit has a second resin lens having a positive refractive power only in the sub-scanning direction.

13 Claims, 12 Drawing Sheets

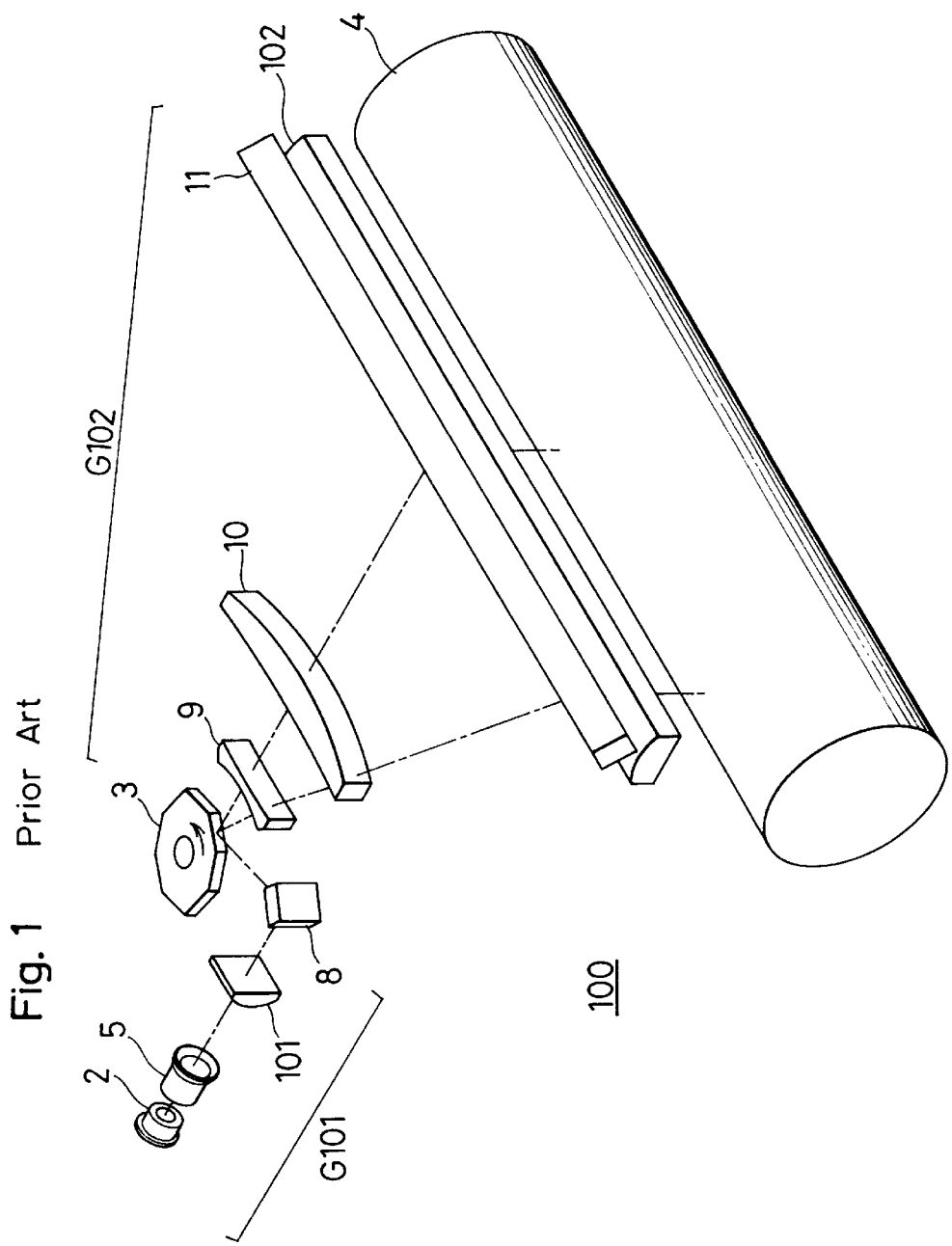

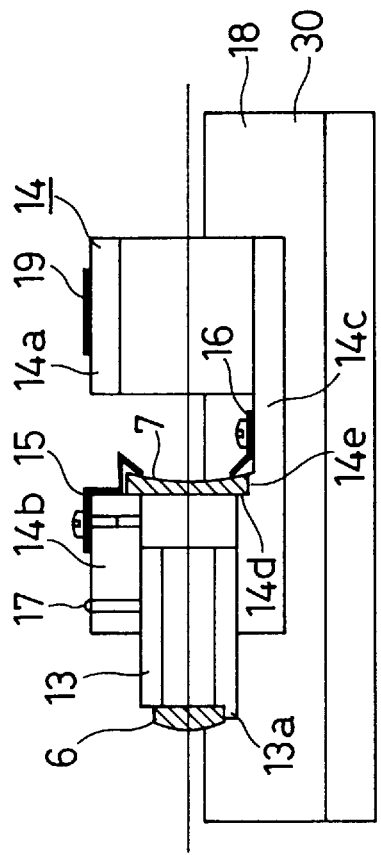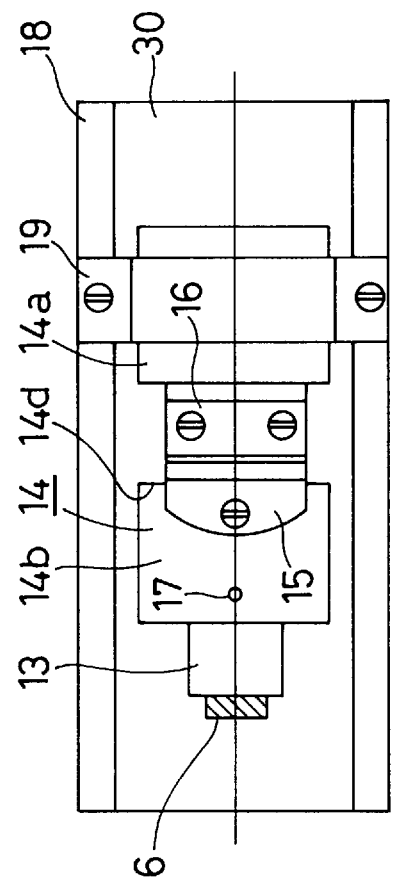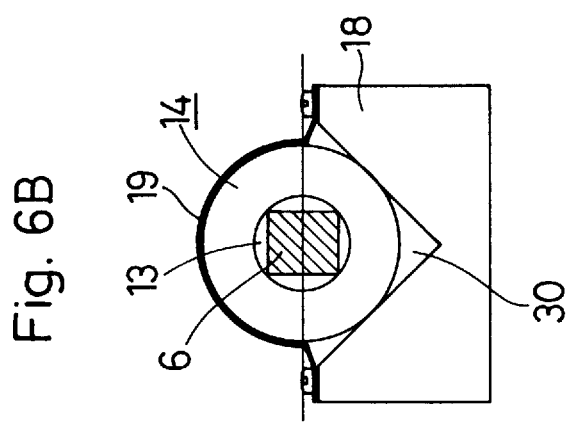

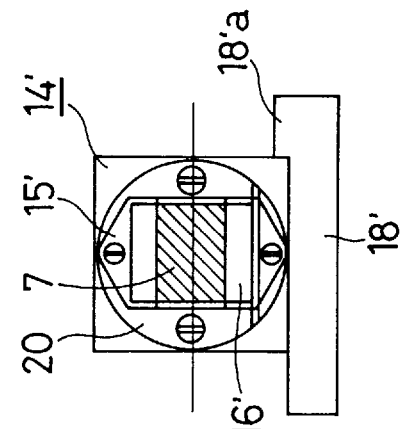
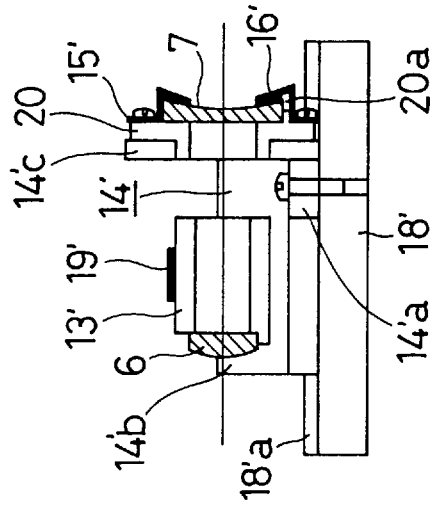
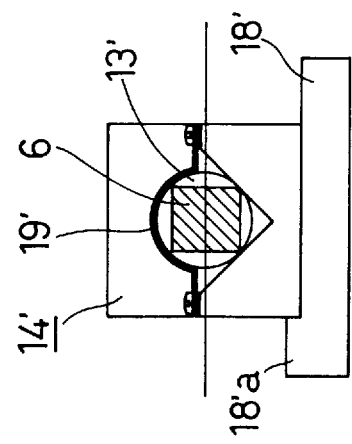
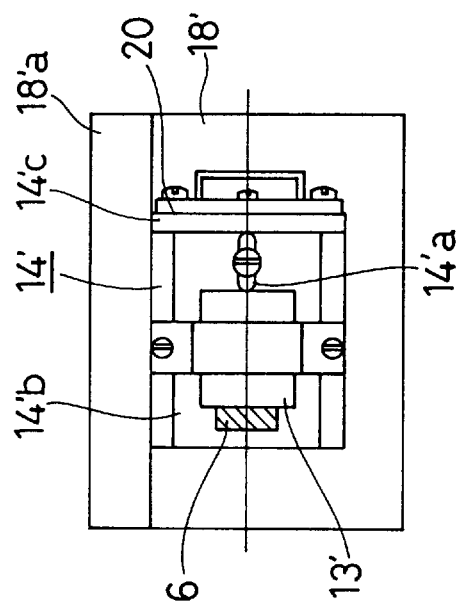

SCANNING OPTICAL APPARATUS

BACKGROUND OF THE INVENTION

1. Field of the Invention

The present invention relates to a scanning optical apparatus, and more specifically, to a scanning optical apparatus used as an image writing means for a printer and a digital copying machine.

2. Description of the Prior Art

The optical scanning apparatus has been frequently used as an image writing means for a printer and a digital copying machine. An example of the scanning optical apparatus will be described with reference to the perspective view of FIG. 1 and the optical path views of FIGS. 2A and 2B.

Referring to FIG. 1, a conventional scanning optical apparatus 100 includes a laser diode 2 serving as a light source, a polygonal mirror 3 serving as a deflector, and a photoreceptor drum 4 serving as a surface to be scanned (hereinafter, referred to as "scanned surface"). The optical system generally includes a first imaging portion G101 which is from the laser diode 2 to the polygonal mirror 3 and a second imaging portion G102 which is from the polygonal mirror 3 to the photoreceptor drum 4.

Hereinafter, a direction parallel to a direction in which the light beams is directed will be referred to as an optical axis direction, a direction that is in a plane vertical to the optical axis direction and in which the light beam is deflected by the polygonal mirror 3 will be referred to as a main scanning direction, and a direction which is in a plane vertical to the optical axis and is orthogonal to the main scanning direction will be referred to as a sub-scanning direction.

The first imaging portion G101 includes from the light source side a collimator lens 5 having a positive refractive power, a plano-convex cylindrical lens 101 having a positive refractive power only in the sub-scanning direction and convex to the light source side, and a first reflecting mirror 8.

The second imaging portion G102 includes from the light source side a first scanning lens 9 which is a bi-concave lens having a negative refractive power, a second scanning lens 10 which is a plano-convex lens having a positive refractive power and plane to the light source side, a second reflecting mirror 11, and an image plane inclination correcting lens 102 which is a plano-convex cylindrical lens having a positive refractive power only in the sub-scanning direction and convex to the light source side.

Referring to FIGS. 2A and 2B, there is schematically shown an optical path of the conventional optical apparatus 100. FIG. 2A is a cross-sectional view of the optical path in the main scanning direction. FIG. 2B is a cross-sectional view of the path in the sub-scanning direction. The construction data of the optical system of the laser optical apparatus 100 are shown in Table 1. In the table, the first surface is the light source side surface of the cylindrical lens 101 and the construction data of the collimator lens 5 are not shown. The laser beam incident on the cylindrical lens 101 is a parallel beam.

TABLE 1

Construction Data of Conventional Apparatus

| Radius of Curvature (Y) | Radius of Curvature (Z) | Surface Configuration | Axial Distance | Refractive Index |
|---|---|---|---|---|
| [Cylindrical lens, made of glass, positive] | | | | |
| 1  ∞ | 103.744 | Y-cylinder | 4.000 | 1.51118 |

TABLE 1-continued

Construction Data of Conventional Apparatus

| Radius of Curvature (Y) | Radius of Curvature (Z) | Surface Configuration | Axial Distance | Refractive Index |
|---|---|---|---|---|
| 2  ∞ | ← | Plane | 200.303 | 1.00000 |
| [Deflection surface] | | | | |
| 5  ∞ | ← | Plane | 33.000 | 1.00000 |
| [Scanning lens] | | | | |
| (G1, made of glass) | | | | |
| 6  −254.411 | ← | Spherical | 7.000 | 1.51118 |
| 7  1098.901 | ← | Spherical | 30.440 | 1.00000 |
| (G2, made of glass) | | | | |
| 8  ∞ | ← | Plane | 15.000 | 1.82489 |
| 9  −147.454 | ← | Spherical | 163.844 | 1.00000 |
| [Image plane inclination correcting lens, made of resin, positive] | | | | |
| 10 ∞ | 44.590 | Y-cylinder | 5.000 | 1.48457 |
| 11 ∞ | ← | Plane | 131.039 | 1.00000 |
| [Scanned surface] | | | | |
| 12 ∞ | ← | Plane | | |

* Light beam incident on the first surface is a parallel beam (object distance is ∞).

In the scanning optical apparatus 100 shown in FIGS. 2A and 2B, the collimator lens 5 shapes a laser beam emitted from the laser diode 2 into a parallel beam with respect to the main and sub-scanning directions. The laser beam exiting from the collimator lens 5 is, in the main scanning direction (see FIG. 2A), deflected by the polygonal mirror 3 while maintaining its parallel state and imaged on the photoreceptor drum 4 by the refractive powers of the first and second scanning lenses 9 and 10.

In the sub-scanning direction (see FIG. 2B), the laser beam from the collimator lens 5 is imaged in the vicinity of the point of deflection of the polygonal mirror 3 by the positive refractive power of the cylindrical lens 101 of the first imaging portion G101. Then, the laser beam reflected by the polygonal mirror 3 passes through the first and second scanning lenses 9 and 10, is reflected by the second reflecting mirror 11, passes through the image plane inclination lens 102, and is re-imaged on the photoreceptor drum 4.

That is, with respect to the sub-scanning direction of the second imaging portion G102, the vicinity of the point of deflection of the polygonal mirror 3 and the image point on the photoreceptor drum 4 are in an optically conjugate relationship and the second imaging portion G102 forms a so-called image plane inclination correcting optical system.

In recent years, there has been a demand that printers and digital copying machines have higher pixel density. Accordingly, in the scanning optical apparatus used in an image writing portion of the image forming apparatus, the permissible range of the size and position of the spot diameter on the photoreceptor drum tends to decrease. In addition, in order to obtain images of excellent quality, it is necessary to reduce the permissible range of the size and position of the spot diameter not only in the main scanning direction but also in the sub-scanning direction. For this reason, an image plane inclination correcting optical system is required to have a high correcting capability.

In order to obtain a high correcting capability in the image plane inclination correcting optical system, the magnification of the second imaging portion G102 is reduced by increasing the sub-scanning direction refractive powers of the first and second scanning lenses or by disposing the image plane inclination correcting lens 102 closer to the photoreceptor drum 4. If the magnification of the second imaging portion G102 is reduced, even if the point of deflection largely shifts in the sub-scanning direction, the generation of an incomplete image caused by an image plane inclination in the sub-scanning direction will not be remarkable since the second imaging portion G102 acts to reduce the error of shift of the spot on the photoreceptor drum 4.

However, if the magnification of the second imaging portion G102 is reduced in the image plane inclination correcting optical system, a problem arises due to an elongation of the image plane inclination correcting lens 102 as described below.

For the magnification reduction of the second imaging portion G102, the method of increasing the sub-scanning direction refractive powers of the first and second scanning lenses 9 and 10 is undesirable. This is because the scanning lens having a high refractive power in the sub-scanning direction cannot be formed of spherical surfaces having equal refractive powers in the main and sub-scanning directions because of magnification limitations in the main scanning direction, and the use of the anamorphic lens for this reason increases the cost. Therefore, for the magnification reduction of the second imaging portion G102, the method of disposing the image plane inclination lens 102 closer to the image side (to the photoreceptor drum 4) is preferred.

When the image plane inclination correcting lens 102 is disposed closer to the image side (to the photoreceptor drum 4), to cover the scanning width, the image plane inclination correcting lens 102 is elongated in the main scanning direction. It is preferred that such an elongate lens is made of resin since if it is made of glass, the manufacture cost will increases.

In resin, however, the variation in refractive index and configuration due to a variation in temperature is greater than in glass. For this reason, if a lens having a great refractive power such as the image plane inclination correcting lens 102 is made of resin, the effect of variation in the refractive power due to environmental changes cannot be ignored, so that the variation in spot diameter on the scanned surface will increase.

SUMMARY OF THE INVENTION

An object of the present invention is to provide a scanning optical apparatus in which the spot diameter of the light beam on the scanned surface does not vary even if the environmental temperature varies.

According to one feature of the present invention, a scanning optical apparatus is provided with a light source, a deflector for deflecting a light beam emitted from the light source to a main scanning direction, a first imaging unit including a first resin lens having a negative refractive power only in a sub-scanning direction perpendicular to the main scanning direction for making the light beam emitted from the light source form an image in the vicinity of the deflection position of said deflector in the sub-scanning direction, and a second imaging unit including a second resin lens having a positive refractive power only in the sub-scanning direction for making the light beam deflected by the deflector form an image on a scanned surface in the sub-scanning direction.

According to another feature of the present invention, a scanning optical apparatus is provided with a light source, a deflector for deflecting a light beam emitted from the light source in a main scanning direction, a first lens and a second lens arranged between the light source and the deflector, and a supporting unit for supporting the first and the second lenses, including a base, a first supporting member for supporting the first lens, and a second supporting member for supporting the second lens, and it is characterized in that the second supporting member can be fixed at any given position with respect to the base, and in that the first supporting member can be fixed both at any given position in an optical axis direction and at any angle about the optical axis with respect to the second supporting member.

According to a further feature of the present invention, a scanning optical apparatus is provided with a light source, an objective lens unit for condensing a light beam emitted from said light source, a first imaging unit for converging the light beam having passed through said objective lens unit in a sub-scanning direction, a deflector arranged at or in the vicinity of an image formation position of the light beam having passed through said first imaging unit, and a second imaging unit for making the light beam deflected by said deflector to form an image on a scanned surface and for maintaining a conjugate relation between said reflector and said scanned surface in a sub-scanning section, and it is characterized in that said objective lens unit condenses the light beam from said light source so that the condensed light beam is directed to said second imaging unit in a main scanning direction, in that said first imaging unit, having a refractive power only in the sub-scanning direction, comprising a glass lens having a positive refractive power in the sub-scanning direction and a resin lens having a negative refractive power in the sub-scanning direction, has as a whole a positive refractive power in the sub-scanning direction, and in that all lens components in said second imaging unit are made of resin, an overall refractive power thereof in the main scanning direction being substantially null.

According to a still further feature of the present invention, a scanning optical apparatus is provided with a light source, an objective lens unit for condensing a light beam emitted from said light source, a first imaging unit including a first resin lens having a negative refractive power in a sub-scanning direction yet having no refractive power in a main scanning direction for making the light beam having passed through said group of lenses converge in the sub-scanning direction, a deflector arranged at or in the vicinity of an image formation position of the light beam having passed through said first imaging unit, a second imaging unit including a second resin lens having a positive refractive power in the sub-scanning direction yet having no refractive power in the main scanning direction for making the light beam deflected by said deflector form an image on a scanned surface and for maintaining a subjugate relation between said deflector and said scanned surface in a sub-scanning section.

BRIEF DESCRIPTION OF THE DRAWINGS

This and other objects and features of this invention will become clear from the following description, taken in conjunction with the preferred embodiments with reference to the accompanied drawings in which:

FIG. 1 is a perspective view showing the optical system of the conventional scanning optical apparatus;

FIGS. 6A, 6B and 6C show an example of a manner of holding first and second cylindrical lenses;

FIGS. 7A, 7B, 7C and 7D show another example of the manner of holding the first and second cylindrical lenses;

DESCRIPTION OF THE PREFERRED EMBODIMENTS

FIGS. 4 to 7 show a first implementation of the present invention. Hereinafter, embodiments of a scanning optical apparatus of the first implementation will be described.

Figure 4A:
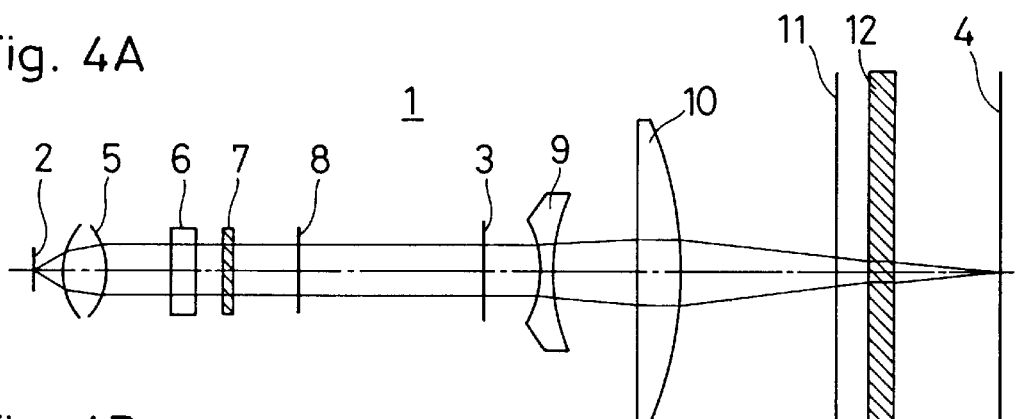
FIGS. 4A and 4B are optical path views showing an optical system of a scanning optical apparatus of the present invention.
Figure 4B:
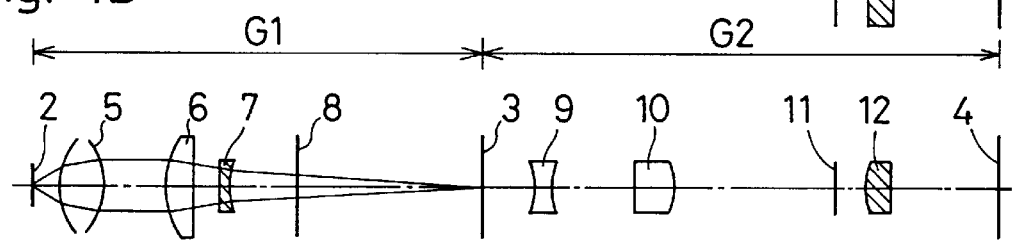

Referring to FIGS. 4A and 4B, there is schematically shown an optical path of a scanning optical apparatus 1 of the present invention. FIG. 4A is a cross-sectional view of the optical path in the main scanning direction. FIG. 4B is a cross-sectional view of the optical path in the sub-scanning direction. The construction data of first to sixth embodiments employing the arrangement of the optical apparatus 1 are shown in Tables 2 to 7. In the tables, the construction data of the collimator lens are not shown like in Table 1. The laser beam incident on a cylindrical lens 6 is a parallel beam.

TABLE 2

Construction Data of 1st Embodiment

| Radius of Curvature (Y) | Radius of Curvature (Z) | Surface Configuration | Axial Distance | Refractive Index |
|---|---|---|---|---|
| [Cylindrical lens, made of glass, positive] | | | | |
| 1    ∞ | 12.780 | Y-cylinder | 3.000 | 1.51118 |
| 2    ∞ | ← | Plane | 12.783 | 1.00000 |
| [Cylindrical lens, made of resin, negative] | | | | |
| 3    ∞ | ← | Plane | 2.200 | 1.48457 |
| 4    ∞* | 4.846 | Y-cylinder | 70.002 | 1.00000 |
| [Deflection surface] | | | | |
| 5    ∞ | ← | Plane | 33.000 | 1.00000 |
| [Scanning lens] | | | | |
| (G1, made of glass) | | | | |
| 6    −254.411 | ← | Spherical | 7.000 | 1.51118 |
| 7    1098.901 | ← | Spherical | 30.440 | 1.00000 |
| (G2, made of glass) | | | | |
| 8    ∞ | ← | Plane | 15.000 | 1.82489 |
| 9    −147.454 | ← | Spherical | 163.844 | 1.00000 |
| [Image plane inclination correcting lens, made of resin, positive] | | | | |
| 10    ∞ | 44.590 | Y-cylinder | 5.000 | 1.48457 |
| 11    ∞ | ← | Plane | 131.039 | 1.00000 |
| [Scanned surface] | | | | |
| 12    ∞ | ← | Plane | | |

* Light beam incident on the first surface is a parallel beam (object distance is ∞).

TABLE 3

Construction Data of 2nd Embodiment

| Radius of Curvature (Y) | Radius of Curvature (Z) | Surface Configuration | Axial Distance | Refractive Index |
|---|---|---|---|---|
| [Cylindrical lens, made of glass, positive] | | | | |
| 1    ∞ | 15.335 | Y-cylinder | 3.000 | 1.51118 |
| 2    ∞ | ← | Plane | 12.933 | 1.00000 |
| [Cylindrical lens, made of resin, negative] | | | | |
| 3    ∞ | ← | Plane | 2.200 | 1.48457 |
| 4    ∞ | 7.753 | Y-cylinder | 91.469 | 1.00000 |
| [Deflection surface] | | | | |
| 5    ∞ | ← | Plane | 33.000 | 1.00000 |
| [Scanning lens] | | | | |
| (G1, made of glass) | | | | |
| 6    −254.411 | ← | Spherical | 7.000 | 1.51118 |
| 7    1098.901 | ← | Spherical | 30.440 | 1.00000 |
| (G2, made of glass) | | | | |
| 8    ∞ | ← | Plane | 15.000 | 1.82489 |
| 9    −147.454 | ← | Spherical | 163.844 | 1.00000 |
| [Image plane inclination correcting lens, made of resin, positive] | | | | |
| 10    ∞ | 44.590 | Y-cylinder | 5.000 | 1.48457 |
| 11    ∞ | ← | Plane | 131.039 | 1.00000 |
| [Scanned surface] | | | | |
| 12    ∞ | ← | Plane | | |

* Light beam incident on the first surface is a parallel beam (object distance is ∞).

TABLE 4

Construction Data of 3rd Embodiment

| Radius of Curvature (Y) | Radius of Curvature (Z) | Surface Configuration | Axial Distance | Refractive Index |
|---|---|---|---|---|
| [Cylindrical lens, made of glass, positive] | | | | |
| 1    ∞ | 17.891 | Y-cylinder | 3.000 | 1.51118 |
| 2    ∞ | ← | Plane | 10.907 | 1.00000 |
| [Cylindrical lens, made of resin, negative] | | | | |
| 3    ∞ | ← | Plane | 2.200 | 1.48457 |
| 4    ∞ | 12.114 | Y-cylinder | 118.663 | 1.00000 |

TABLE 4-continued

Construction Data of 3rd Embodiment

| Radius of Curvature (Y) | Radius of Curvature (Z) | Surface Configuration | Axial Distance | Refractive Index |
|---|---|---|---|---|
| [Deflection surface] | | | | |
| 5    ∞ | ← | Plane | 33.000 | 1.00000 |
| [Scanning lens] | | | | |
| (G1, made of glass) | | | | |
| 6    −254.411 | ← | Spherical | 7.000 | 1.51118 |
| 7    1098.901 | ← | Spherical | 30.440 | 1.00000 |
| (G2, made of glass) | | | | |
| 8    ∞ | ← | Plane | 15.000 | 1.82489 |
| 9    −147.454 | ← | Spherical | 163.844 | 1.00000 |
| [Image plane inclination correcting lens, made of resin, positive] | | | | |
| 10   ∞ | 44.590 | Y-cylinder | 5.000 | 1.48457 |
| 11   ∞ | ← | Plane | 131.039 | 1.00000 |
| [Scanned surface] | | | | |
| 12   ∞ | ← | Plane | | |

* Light beam incident on the first surface is a parallel beam (object distance is ∞).

TABLE 5

Construction Data of 4th Embodiment

| Radius of Curvature (Y) | Radius of Curvature (Z) | Surface Configuration | Axial Distance | Refractive Index |
|---|---|---|---|---|
| [Cylindrical lens, made of glass, positive] | | | | |
| 1    ∞ | 20.447 | Y-cylinder | 3.000 | 1.51118 |
| 2    ∞ | ← | Plane | 8.533 | 1.00000 |
| [Cylindrical lens, made of resin, negative] | | | | |
| 3    ∞ | ← | Plane | 2.200 | 1.48457 |
| 4    ∞ | 16.960 | Y-cylinder | 140.801 | 1.00000 |
| [Deflection surface] | | | | |
| 5    ∞ | ← | Plane | 33.000 | 1.00000 |
| [Scanning lens] | | | | |
| (G1, made of glass) | | | | |
| 6    −254.411 | ← | Spherical | 7.000 | 1.51118 |
| 7    1098.901 | ← | Spherical | 30.440 | 1.00000 |
| (G2, made of glass) | | | | |
| 8    ∞ | ← | Plane | 15.000 | 1.82489 |
| 9    −147.454 | ← | Spherical | 163.844 | 1.00000 |
| [Image plane inclination correcting lens, made of resin, positive] | | | | |
| 10   ∞ | 44.590 | Y-cylinder | 5.000 | 1.48457 |
| 11   ∞ | ← | Plane | 131.039 | 1.00000 |
| [Scanned surface] | | | | |
| 12   ∞ | ← | Plane | | |

* Light beam incident on the first surf ace is a parallel beam (object distance is ∞).

TABLE 6

Construction Data of 5th Embodiment

| Radius of Curvature (Y) | Radius of Curvature (Z) | Surface Configuration | Axial Distance | Refractive Index |
|---|---|---|---|---|
| [Cylindrical lens, made of glass, positive] | | | | |
| 1    ∞ | 23.003 | Y-cylinder | 3.000 | 1.51118 |
| 2    ∞ | ← | Plane | 6.658 | 1.00000 |
| [Cylindrical lens, made of resin, negative] | | | | |
| 3    ∞ | ← | Plane | 2.200 | 1.48457 |
| 4    ∞ | 21.806 | Y-cylinder | 155.804 | 1.00000 |
| [Deflection surface] | | | | |
| 5    ∞ | ← | Plane | 33.000 | 1.00000 |
| [Scanning lens] | | | | |
| (G1, made of glass) | | | | |
| 6    −254.411 | ← | Spherical | 7.000 | 1.51118 |
| 7    1098.901 | ← | Spherical | 30.440 | 1.00000 |

TABLE 6-continued

Construction Data of 5th Embodiment

| Radius of Curvature (Y) | Radius of Curvature (Z) | Surface Configuration | Axial Distance | Refractive Index |
|---|---|---|---|---|
| (G2, made of glass) | | | | |
| 8    ∞ | ← | Plane | 15.000 | 1.82489 |
| 9    −147.454 | ← | Spherical | 163.844 | 1.00000 |
| [Image plane inclination correcting lens, made of resin, positive] | | | | |
| 10   ∞ | 44.590 | Y-cylinder | 5.000 | 1.48457 |
| 11   ∞ | ← | Plane | 131.039 | 1.00000 |
| [Scanned surface] | | | | |
| 12   ∞ | ← | Plane | | |

* Light beam incident on the first surface is a parallel beam (object distance is ∞).

TABLE 7

Construction Data of 6th Embodiment

| Radius of Curvature (Y) | Radius of Curvature (Z) | Surface Configuration | Axial Distance | Refractive Index |
|---|---|---|---|---|
| [Cylindrical lens, made of glass, positive] | | | | |
| 1    ∞ | 25.559 | Y-cylinder | 3.000 | 1.51118 |
| 2    ∞ | ← | Plane | 1.530 | 1.00000 |
| [Cylindrical lens, made of resin, negative] | | | | |
| 3    ∞ | ← | Plane | 2.200 | 1.48457 |
| 4    ∞ | 29.074 | Y-cylinder | 180.858 | 1.00000 |
| [Deflection surface] | | | | |
| 5    ∞ | ← | Plane | 33.000 | 1.00000 |
| [Scanning lens] | | | | |
| (G1, made of glass) | | | | |
| 6    −254.411 | ← | Spherical | 7.000 | 1.51118 |
| 7    1098.901 | ← | Spherical | 30.440 | 1.00000 |
| (G2, made of glass) | | | | |
| 8    ∞ | ← | Plane | 15.000 | 1.82489 |
| 9    −147.454 | ← | Spherical | 163.844 | 1.00000 |
| [Image plane inclination correcting lens, made of resin, positive] | | | | |
| 10   ∞ | 44.590 | Y-cylinder | 5.000 | 1.48457 |
| 11   ∞ | ← | Plane | 131.039 | 1.00000 |
| [Scanned surface] | | | | |
| 12   ∞ | ← | Plane | | |

* Light beam incident on the first surface is a parallel beam (object distance is ∞).

Referring to FIGS. 4A and 4B, since the arrangement of the scanning optical apparatus 1 of the present invention is the same as that of the scanning optical apparatus 100 described in the description of the prior art, only different features will be described and detailed description will not be given.

In the scanning optical apparatus 1, a plano-convex first cylindrical lens 6 (first lens) convex to the light source side and having a refractive power only in the sub-scanning direction and a plano-concave second cylindrical lens 7 (second lens) plane to the light source side and having a refractive power only in the sub-scanning direction are disposed in the position of the cylindrical lens 101 of the conventional scanning optical apparatus 100. A plano-convex image plane inclination correcting lens 12 convex to the light source side and having a refractive power only in the sub-scanning lens is disposed in the position of the image plane inclination correcting lens 102 of the conventional scanning optical apparatus 100. In the scanning optical apparatus 1, a first imaging portion G1 is from the laser diode 2 to the polygonal mirror 3, and a second imaging portion G2 is from the polygonal mirror 3 to the photoreceptor drum 4.

In the first to sixth embodiments of the present invention, the second cylindrical lens 7 and the image plane inclination correcting lens 12 (hatched in the figures) are made of resin and the other lenses are made of glass.

In the scanning optical apparatus shown in FIGS. 4A and 4B, the laser beam emitted from the laser diode 2 is shaped into a parallel beam by the collimator lens 5.

In the main scanning direction, the laser beam (see FIG. 4A) is imaged on the photoreceptor drum 4 to scan its surface by the same manner as in the optical path described with respect to the conventional apparatus.

On the other hand, in the sub-scanning direction, the laser beam (see FIG. 4B) is imaged in the vicinity of the point of deflection of the polygonal mirror 3 by the first cylindrical lens 6 and the second cylindrical lens 7 and is re-imaged on the scanned surface by the overall positive refractive power of the scanning lens including the first scanning lens 9 and the second scanning lens 10 and the positive refractive power of the image plane inclination correcting lens 12. That is, the second imaging portion G2 also forms an image plane correcting optical system.

Figure 2A:
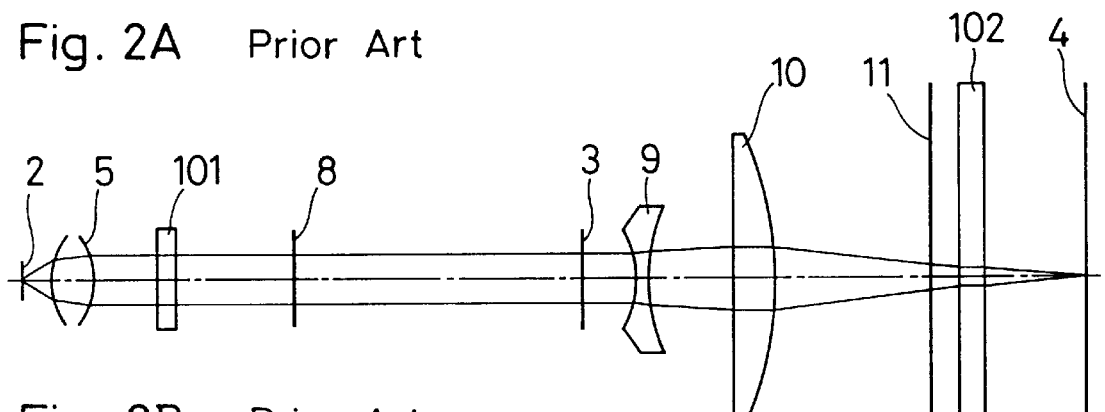
FIGS. 2A and 2B are optical path views showing the optical system of the conventional scanning optical apparatus.
Figure 2B:
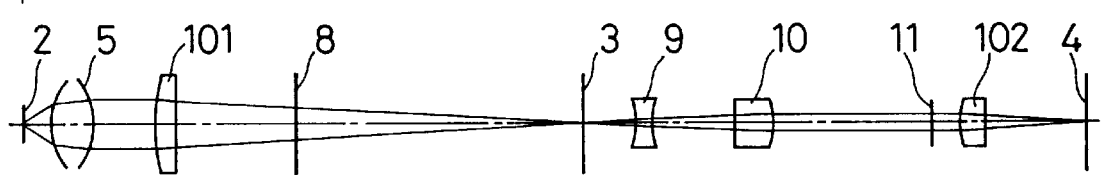
Figure 3:
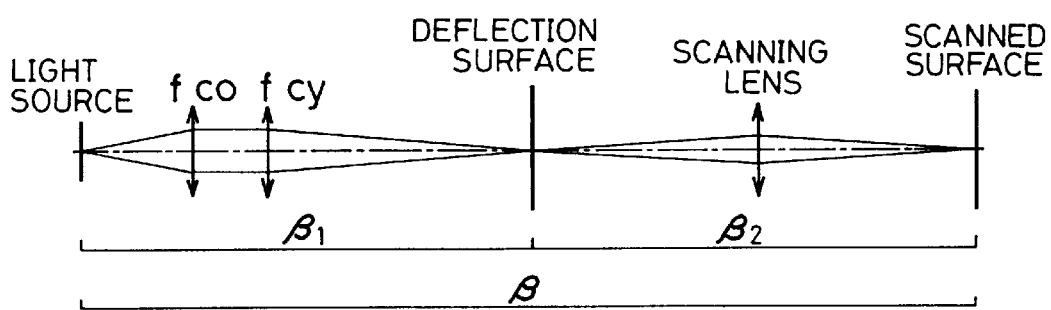
FIG. 3 is a schematic view showing the refractive power arrangement of the conventional scanning optical apparatus in the sub-scanning direction.

According to the lens arrangement of the scanning optical apparatus 1 (see FIGS. 4A and 4B), the total length of the first imaging portion can be shorter than in the conventional scanning optical apparatus 100 (see FIGS. 2A and 2B). That is, in order to image the parallel beam in the sub-scanning direction, the cylindrical lens 101 is used in the first imaging portion G101 of the conventional apparatus, whereas in the first imaging portion G1 of the present invention, the refractive power is divided between the first cylindrical lens 6 and the second cylindrical lens 7. With this lens arrangement, the lens principal point corresponding to the image on the deflection surface shifts toward the light source side, so that the composite focal length of the first cylindrical lens 6 and the second cylindrical lens 7 is reduced.

Generally, when the environmental temperature varies, lens materials vary in configuration and refractive index. However, the variation of resin in configuration and refractive index due to a variation in temperature is very great compared to that of glass. Therefore, to a variation in environmental temperature, in the case of the scanning optical apparatus 1 of the embodiments of the present invention, the contribution of the second cylindrical lens 7 and the image plane inclination correcting lens 12 is the greatest.

Specifically, when the environmental temperature varies, the configuration of the lens expands to reduce the refractive index, so that the refractive powers of the second cylindrical lens 7 and the image plane inclination correcting lens 12 vary according to the variation in configuration and refractive index. For example, when the environmental temperature rises, the absolute values of refractive powers of the second cylindrical lens 7 and the image plane inclination correcting lens 12 decrease. However, since the signs of refractive powers of the second cylindrical lens 7 and the image plane inclination correcting lens 12 are opposite to each other, the variation in refractive power of one of them compensates for the variation in refractive power of the other. As a result, the variation in spot diameter on the scanned surface is minimized.

In the scanning optical apparatus 1 of the present invention, such a compensation is effective only with respect to the sub-scanning direction. With respect to the main scanning direction, the effect of the variation in environmental temperature is small since the lenses having refractive power in this direction are all made of glass.

Next, a manner of holding the first and second cylindrical lenses 6 and 7 of the optical apparatus 1 will be described.

FIGS. 6A, 6B and 6C show an example of a holder for holding the first cylindrical lens 6 and the second cylindrical lens 7 of the optical apparatus 1. FIG. 6A is a cross-sectional view taken on a plane including the optical axis and parallel to the sub-scanning direction. FIG. 6B is a view projected on a plane seen from the light source side. FIG. 6C is a view projected on a plane which include the main scanning direction and the optical axis. The the holder for holding the first and second cylindrical lenses 6 and 7 generally includes a base 18 attached to the apparatus to support the entire holder, a first cylindrical lens holder 13 to which the first cylindrical lens 6 is attached, and a second cylindrical lens holder 14 to which the second cylindrical lens 7 is attached. The first cylindrical lens 6 and the second cylindrical lens 7 (hatched in the figure) are rectangular lenses whose attachment surfaces are planes.

The base 18 substantially takes the shape of a rectangular parallelopiped on the upper surface of which is formed a V-groove 30 extending in parallel with the optical axis. The second cylindrical lens holder 14 which substantially takes the shape of a cylinder is supported by the V-groove 30 with its cylindrical surface in contact with the slanting surfaces of the V-groove 30. The V-groove 30 of the base 18 is formed so that the sub-scanning direction height of the generating line of the second cylindrical lens 7 is aligned with the height of the optical axis with the second cylindrical lens holder 14 supported in the V-groove.

The second cylindrical lens holder 14 substantially takes the shape of a cylinder. More specifically, the second cylindrical lens holder 14 includes two cylinders 14a and 14b and a connector 14c forming a part of the cylinders 14a and 14b to connect them along the generating line. The cylinder 14a of the second cylindrical lens holder 14 is secured by a plate spring 19 so as not to move relative to the base 18. To an end surface 14d of the other cylinder 14b of the second cylindrical lens holder 14 which is opposite the cylinder 14a, the second cylindrical lens 7 is attached. The second cylindrical lens 7, which is made of resin as mentioned above, is secured not by bonding but by being pressed by plate springs 15 and 16 screwed to the connector 14c. In the vicinity of the end surface 14d is formed a plane portion 14e which is in parallel with the main scanning surface. By setting the second cylindrical lens 7 so that its attachment surface which is in parallel with the cylinder generating line abuts the plane portion 14e, the sub-scanning direction heights of the cylinder generating line and the optical axis are aligned. The inner diameter of the cylinder 14b of the second cylindrical lens holder 14 is the same as the outside diameter of the first cylindrical lens holder 13, and the first cylindrical lens holder 13 is partly inserted into the cylinder 14b. The first cylindrical lens holder 13 is secured to the inner surface of the cylinder 14b by being pressed by a setting screw 17 inserted through the side wall of the cylinder 14b.

The first cylindrical lens holder 13 substantially takes shape of a cylinder having in its center a hole for the light beam to pass therethrough. The side wall of the first cylindrical lens holder 13 partly protrudes at the side which is not inserted into the second cylindrical lens holder 14, and on the optical axis side surface of the protruding portion is formed a plane portion 13a which is in parallel with the main scanning surface. The first cylindrical lens 6 is bonded to the end surface which is not inserted into the second cylindrical lens holder 14 and to the plane portion 13a. Similarly to the case of the plane portion 14e, by setting the first cylindrical lens 6 so that its attachment surface which is in parallel with the cylinder generating line abuts the plane portion 13a, the sub-scanning direction heights of the cylinder generating line and the optical axis are aligned.

The first cylindrical lens 6 and the second cylindrical lens 7 are adjusted in the following manner: First, the first cylindrical lens 6 and the second cylindrical lens 7 are attached to the lens holders 13 and 14, respectively. Then, the two lens holders 13 and 14 are engaged with each other and the relative positions of the first and second cylindrical lenses 6 and 7, i.e. the axial distance and the direction of the cylinder generating line are adjusted by rotating and moving the holders 13 and 14 until they are located in predetermined positions, respectively. Then, they are secured to form a lens block. On the other hand, the base 18 is adjusted so that the central line of the V-groove 30 is substantially aligned with the optical axis of the optical apparatus, and is attached to the optical apparatus. The center of the optical axis can be aligned only by placing the optically adjusted lens block on the base 18. Lastly, the position of the lens block, i.e. the optical axis direction distance from another optical element such as the light source and the direction of the cylinder generating line are adjusted and the lens block is secured by the plane spring 19. By adjusting in this manner, the cylindrical lenses can be easily positioned.

FIGS. 7A to 7D show another example of the holder for holding the first and second cylindrical lenses of the optical apparatus of the embodiments. FIG. 7A is a cross-sectional view taken on a plane including the optical axis and parallel to the sub-scanning direction. FIG. 7B is a view projected on a plane seen from the light source side. FIG. 7C is a cross-sectional view taken on a plane including the main scanning direction and the optical axis. FIG. 7D is a view projected on a plane seen from the image side. In those figures, the holder for holding the first and second cylindrical lenses generally includes a base 18' attached to the apparatus to support the entire holder, a first cylindrical lens holder 13 to which the first cylindrical lens 6 is attached, a second cylindrical lens holding member 20 to which the second cylindrical lens 7 is attached, and the second cylindrical lens holder 14'. The first cylindrical lens 6 and the second cylindrical lens 7 (hatched in the figure) are rectangular lenses whose attachment surfaces are planes. The first cylindrical lens holder 13 has the same structure as that of the holder of FIGS. 6A to 6C and description thereof will not be given.

The base 18' substantially takes the shape of a plane. On the upper plane surface thereof, a positioning rail 18a' extending in parallel with the optical axis is formed to protrude in the sub-scanning direction. The optical axis side end surface of the positioning rail 18a' is formed to be a plane vertical to the main scanning direction. At an upper portion of the base 18', the second cylindrical lens holder 14' is mounted with its side surface pressed against the plane surface of the positioning rail 18a'.

The second cylindrical lens holder 14' includes a V-groove 14b' extending along the optical axis and a plane portion 14c' having an end surface vertical to the optical axis. The second cylindrical lens holder 14' is screwed to the base 18' through an elongate hole 14a' formed on the central line of the bottom of the V-groove 14b' to be elongated along the optical axis. On the slanting surfaces of the V-groove 14b', the first cylindrical lens holder 13 is supported with its cylindrical side surface in contact with the slanting surfaces. The V-groove 14b' is formed so that the generating line of the first cylindrical lens 6 attached to the first cylindrical lens holder 13 is located at a predetermined sub-scanning direction height. The first cylindrical lens holder 13' is secured so as not to move relative to the second cylindrical lens holder 14' by a plane spring 19' screwed to the second cylindrical lens holder 14'.

The second cylindrical lens holding member 20 takes the shape of a flange. The plane portion 14c' of the second cylindrical lens holder 14' has a through hole formed along the optical axis and the inner diameter of the through hole and the outer diameter of the thinner side of the flange-shaped second cylindrical lens holding member 20 are the same. The second cylindrical lens holding member 20 is screwed with its thinner side inserted into the through hole of the second cylindrical lens holder 14'. On the thicker side end surface of the second cylindrical lens holding member 20, a plane portion 20a is formed in parallel with the main scanning direction to protrude along the optical axis for the positioning of the cylinder generating line of the second cylindrical lens 7. The sub-scanning direction height of the second cylindrical lens 7 is determined by setting the cylindrical lens 7 so that its attachment surface which is parallel to the cylinder generating line abuts the plane portion 20a. The second cylindrical lens 7 is attached to the holding member 20 by plane springs 15' and 16' screwed to the holding member 20.

In the holder of FIG. 7, the first and second cylindrical lenses 6 and 7 are adjusted in the following manner: First, the first and second cylindrical lenses 6 and 7 are secured to the first cylindrical lens holder 13' and to the second cylindrical lens holding member 20, respectively, and the second cylindrical lens holding member 20 is inserted into the through hole of the lens holder 14'. Then, the lens holder 13' is set so as to abut the V-groove 14b' of the lens holder 14, and the relative positions of the first and second cylindrical lenses 6 and 7, i.e. the axial distance and the direction of the cylinder generating line are adjusted by rotating and moving the lens holder 13 until it is located in a predetermined position.

Then, the lens holder 13 is secured and the second cylindrical lens holding member 20 is screwed to the lens holder 14' to form a lens block. The lens block is pressed against the positioning rail 18a' on the base 18' to determine the main scanning direction central position of the holder 14', and the position of the lens block, i.e. the optical axis direction distance from another optical element such as the light source and the direction of the cylinder generating line are adjusted. Then, the lens block is secured by a screw at the elongate hole 14a'. By adjusting in this manner, the cylindrical lenses can be easily positioned.

Next, conditions for the second cylindrical lens 7 and the image plane inclination correcting lens 12 in order that the spot diameter on the scanned surface does not vary even if the environmental temperature varies will be described in detail.

Figure 5:
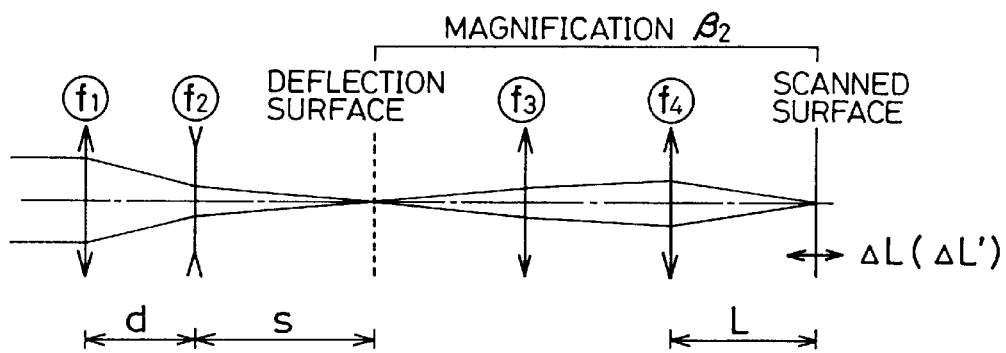
FIG. 5 is a schematic view showing the refractive power arrangement of the present invention in the sub-scanning direction.

Referring to FIG. 5, there is schematically shown a sub-scanning direction refractive power arrangement of the optical system of the embodiments of the present invention. In FIG. 5, $f_1$ is the focal length of the first cylindrical lens 6. $f_2$ is the focal length of the second cylindrical lens 7. $f_3$ is the composite focal length of the first scanning lens 9 and the second scanning lens 10. $f_4$ is the focal length of the image plane inclination correcting lens 12. The distance between the rear principal point of the first cylindrical lens 6 and the front principal point of the second cylindrical lens 7 is d. The distance between the image side principal point of the second cylindrical lens 7 and the imaging point in the vicinity of the deflection surface is S. The distance between the image side principal point of the image plane inclination correcting lens 12 and the imaging point on the scanned surface is L.

In the process of deriving the expressions shown below, it is assumed that the variation in refractive index of the glass lenses and the effect of thermal expansion of glass are sufficiently negligible for the variation in configuration and refractive index of the second cylindrical lens 7 and the image plane inclination correcting lens 12.

1. Basic Idea

For the self compensation of the imaging position by the second cylindrical lens 7 and the image plane inclination correcting lens 12, a variation $\Delta L$ in the distance L due to a variation in refractive index of the second cylindrical lens 7 and a variation $\Delta L'$ in the distance L due to a variation in refractive index of the image plane inclination correcting lens 12 caused by a variation in temperature should equal each other. That is, it is necessary that the following condition be fulfilled:

$$\Delta L = -\Delta L' \tag{1}$$

where $\Delta L$ is the variation in the distance L due to a variation in refractive index of the second cylindrical lens 7, and $\Delta L'$ is the variation in the distance L due to a variation in refractive index of the image plane inclination correcting lens 12.

$\Delta L$ and $\Delta L'$ can also be expressed as follows:

$$\begin{aligned} \Delta L &= \Delta T \cdot \frac{ds}{dT} \cdot \beta_2^2 \\ &= \Delta T \cdot \frac{ds}{df_2} \cdot \frac{df_2}{dT} \cdot \beta_2^2 \end{aligned} \tag{2}$$

where T is the temperature, and $\beta_2$ is the magnification of the second imaging portion in the sub-scanning direction.

$$\begin{aligned} \Delta L' &= \Delta T \cdot \frac{dL}{dT} \\ &= \Delta T \cdot \frac{dL}{df_4} \cdot \frac{df_4}{dT} \end{aligned} \tag{3}$$

2. Derivation of $\Delta L$

A specific manner of derivation of $\Delta L$ will be described.

The distance S between the image side principal point of the second cylindrical lens 7 and the imaging point in the vicinity of the deflection surface is expressed by the following expression (4):

$$S(f_2) = \frac{(f_1 - d) \cdot f_2}{(f_1 - d) + f_2} \tag{4}$$

$$\frac{ds(f_2)}{df_2} = \left\{ \frac{f_1 - d}{(f_1 - d) + f_2} \right\}^2$$

The focal length $f_2$ of the second cylindrical lens 7 is expressed by the following expression (5):

$$f_2(r_2, n) = \frac{r_2}{1 - n} \tag{5}$$

$$\frac{df_2(r_2,n)}{dT} = \frac{\partial f_2}{\partial r_2} \cdot \frac{\partial r_2}{\partial T} + \frac{\partial f_2}{\partial n} \cdot \frac{\partial n}{\partial T}$$

The second cylindrical lens 7 is a plano-concave cylindrical lens plane to the light source side. When the radius of curvature of the concave surface is $r_2$ and the refractive index thereof is n, the temperature variation is expressed by:

$$r_2(T) = r_2 + r_2 \cdot \alpha \cdot \Delta T$$

$$n(T) = n_0 + \frac{dn}{dT} \cdot \Delta T$$

where a is a linear expansion coefficient, $n_0$ is a design value of the refractive index, and dn/dT is a temperature coefficient of the refractive index.

From these expressions, the expression (5) is rearranged as:

$$\frac{df_2}{dT} = f_2 \cdot \left( \alpha + \frac{1}{1-n} \cdot \frac{dn}{dT} \right) \tag{6}$$

Thus, by substituting the expressions (4) and (6) into the expression (2), $\Delta L$ is obtained by the following expression (7):

$$\Delta L = \Delta T \cdot \left\{ \frac{f_1 - d}{(f_2 - d) + f_2} \right\}^2 \cdot f_2 \cdot \left( \alpha + \frac{1}{1-n} \cdot \frac{dn}{dT} \right) \cdot \beta_2^2 \tag{7}$$

3. Derivation of $\Delta L'$

A specific manner of derivation of $\Delta L'$ will be described below.

The distance L between the image side principal point of the image plane inclination correcting lens 12 to the imaging point on the scanned surface is expressed by the following expression (8):

$$L(f_4) = (1 - \beta_2) \cdot f_4 \tag{8}$$

$$\frac{dL}{df_4} = 1 - \beta_2$$

The focal length $f_4$ of the image plane inclination correcting lens 12 is expressed by the following expression (9):

$$f_4(r_4, n) = \frac{r_4}{n - 1} \tag{9}$$

$$\frac{df_4(r_4,n)}{dT} = \frac{\partial f_4}{\partial r_4} \cdot \frac{\partial r_4}{\partial T} + \frac{\partial f_4}{\partial n} \cdot \frac{\partial n}{\partial T}$$

The image plane inclination correcting lens 12 is a planoconvex cylindrical lens convex to the light source side. When the radius of curvature of the convex surface is $r_2$ and the refractive index thereof is n, the temperature variation is expressed by:

$$r_4(T) = r_4 + r_4 \cdot \alpha \cdot \Delta T$$

$$n(T) = n_0 + \frac{dn}{dT} \cdot \Delta T$$

From these expressions, the expression (8) is rearranged as:

$$\frac{df_4}{dT} = f_4 \cdot \left( \alpha + \frac{1}{1-n} \cdot \frac{dn}{dT} \right) \tag{10}$$

Thus, by substituting the expressions (8) and (10) into the expression (3), $\Delta L'$ is obtained by the following expression (11):

$$\Delta L' = \Delta T \cdot (1 - \beta_2) \cdot f_4 \cdot \left( \alpha + \frac{1}{1-n} \cdot \frac{dn}{dT} \right) \tag{11}$$

4. Self Temperature Compensation Condition

From the above, by substituting the expressions (7) and (11) into the expression (1), the following expression (12) is obtained as a condition for the self temperature compensation of the imaging position by the second cylindrical lens 7 and the image plane inclination lens 12:

$$1 = \left\{ \frac{f_1 - d}{(f_1 - d) + f_2} \right\}^2 \cdot \frac{f_2}{f_4} \cdot \frac{\beta_2^2}{\beta_2 - 1} \quad (12)$$

5. Modification of Self Temperature Compensation Condition

The self temperature compensation condition (12) is derived in consideration of only the variation in refractive index of the second cylindrical lens 7 and the image plane inclination correcting lens 12 made of resin. In the actual scanning optical apparatus, however, there are various other factors which affect the imaging condition of the light beam. Therefore, it is difficult to make the temperature compensation only by the condition (12).

In particular, when the supporting member for the laser diode 2 and the collimator lens 5 is made of a material which expands with an increase in temperature, the imaging position shifts in a direction to decrease the distance L with an increase in temperature. The use of this action for the temperature compensation is effective since the focal length $f_4$ can be reduced more than by the compensation only by use of the condition (12).

The inventors of the present invention carried out various experiments to find that, in consideration of the effect of variation in the distance between the laser diode 2 and the collimator lens 5 for the condition (12), it is preferred to modify the condition (12) to the condition (13) shown below. It is assumed that the condition (13) covers 0 or more (value of aluminum) as the linear expansion coefficient of the material of the supporting member for the laser diode 2 and the collimator lens 5.

$$1 \leq \left\{ \frac{f_1 - d}{(f_1 - d) + f_2} \right\}^2 \cdot \frac{f_2}{f_4} \cdot \frac{\beta_2^2}{\beta_2 - 1} \leq 2 \quad (13)$$

When the lower limit of the condition (13) is exceeded, the imaging position shifts excessively toward the light source side when the temperature rises. When the upper limit is exceeded, the imaging position shifts excessively toward the image side. These are both undesirable.

Values of the expressions of the first to sixth embodiments are shown in Table 8.

TABLE 8

Values of Expressions of Embodiments

| | $f_1$ | $f_2$ | d | $f_4$ | (13) | Value of (13) |
|---|---|---|---|---|---|---|
| 1st embodiment | 25.00 | −10.00 | 16.25 | 90.02 | −0.73 | 1.64 |
| 2nd embodiment | 30.00 | −16.00 | 16.40 | 90.02 | −0.73 | 1.72 |
| 3rd embodiment | 35.00 | −25.00 | 14.38 | 90.02 | −0.73 | 1.86 |
| 4th embodiment | 40.00 | −35.00 | 12.00 | 90.02 | −0.73 | 1.87 |
| 5th embodiment | 45.00 | −45.00 | 10.13 | 90.02 | −0.73 | 1.78 |
| 6th embodiment | 50.00 | −60.00 | 5.00 | 90.02 | −0.73 | 1.80 |

Note: d is calculated by the following expression:

$$d = f_1 + f_2 - f_1 \cdot \frac{f_2}{f}$$

where f (composite focal length of $f_1$ and $f_2$)=200.

In the first to sixth embodiments, since the condition (13) is fulfilled, even if the refractive power of the image plane inclination correcting lens 12 having a positive refractive power varies due to an increase in the environmental temperature, the imaging position on the scanned surface does not vary since the refractive power of the second cylindrical lens 7 having a negative refractive power and the distance between the laser diode 2 and the collimator lens 5 compensate for the refractive power of the image plane inclination correcting lens 12.

As described above, the scanning optical apparatus according to the present invention has a high capability of correcting the image plane inclination error of the deflection surface and even if the environmental temperature varies, the first lens having a negative refractive power and made of resin and the second lens having a positive refractive power and made of resin act to compensate for each other's refractive powers, so that the imaging position on the scanned surface does not vary.

Therefore, when employed in an image forming apparatus such as a printer and a digital copying machine, since the imaging position is compensated for when the environmental temperature varies, it proves to be an image forming apparatus of a high image quality.

Since the lens arrangement of the first imaging portion enables a reduction in the total length of the first imaging portion while the sub-scanning direction magnification of the second imaging portion is reduced, a compact optical apparatus is realized.

In addition, in this scanning optical apparatus, since there is no resin-made lens having refractive power in the main scanning direction, a stable imaging condition is maintained in the main scanning direction.

In the lens holder of this scanning optical apparatus, since the two lenses having different refractive powers in the main and sub-scanning directions can be accurately positioned, the spot on the scanned surface is formed with an excellent position accuracy, so that the quality of the image formed by the scanning optical apparatus using the lens holder improves.

FIGS. 8 to 16 show a second implementation of the present invention. Hereinafter, embodiments of a scanning optical apparatus of the second implementation will be described.

Figure 8A:
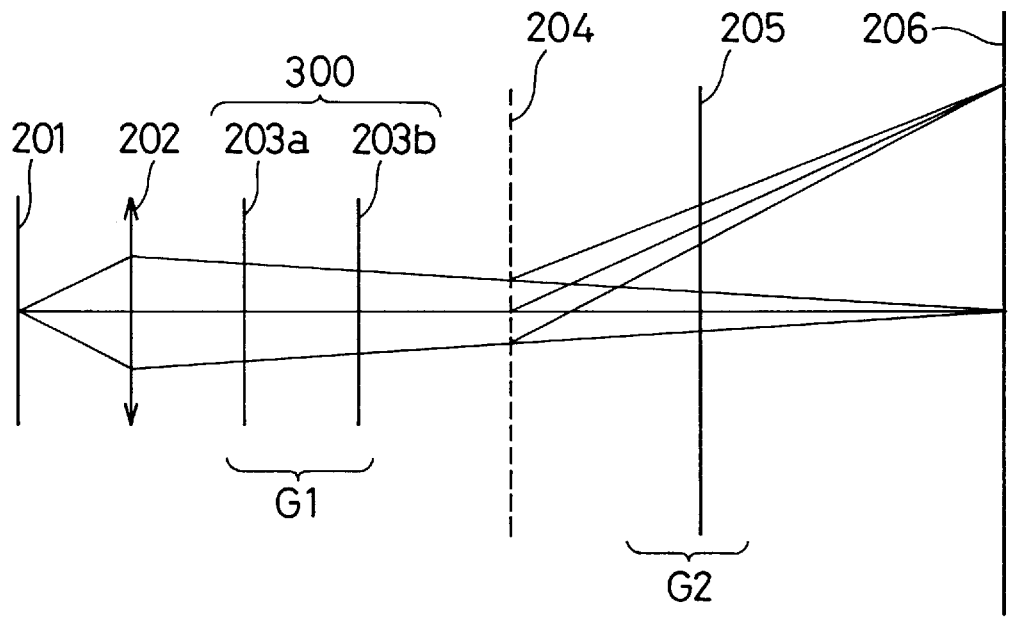
FIG. 8A is a cross-sectional view schematically showing the refractive power arrangement and optical path of the present invention in the main scanning direction.
Figure 8B:
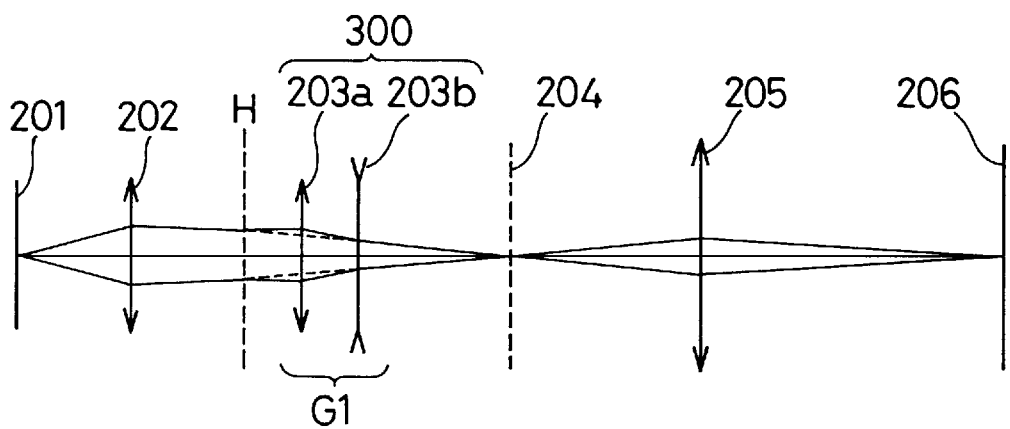
FIG. 8B is a cross-sectional view schematically showing the refractive power arrangement and optical path of the present invention in the sub-scanning direction.

FIGS. 8A and 8B show the refractive power arrangement and optical path of the laser scanning optical system of the present invention. FIG. 8A shows the cross section in the main scanning direction. FIG. 8B shows the cross section in the sub-scanning direction. Reference numeral 201 represents a light source. Reference numeral 202 represents an objective lens. Reference numeral 203 represents an anamorphic lens which forms a first imaging portion G1. Reference designation 203a represents a glass lens (hereinafter, sometimes referred to as "first cylindrical lens", but not necessarily a cylindrical lens) having a positive refractive power in the sub-scanning direction. Reference designation 203b represents a resin lens (hereinafter, sometimes referred to as "second cylindrical lens", but not necessarily a cylindrical lens) having a negative refractive power in the sub-scanning direction. Reference numeral 204 represents a deflective reflection surface. Reference numeral 205 represents a scanning lens which forms a second imaging portion G2. Reference numeral 206 represents a scanned surface (image plane). Reference designation H represents the principal point of the anamorphic lens 203 (first and second cylindrical lenses 203a and 203b).

The lens elements included in the scanning lens 205 are all made of resin, and as shown in FIG. 8A, the overall refractive power of the scanning lens 205 is substantially null in the main scanning direction. Now, the reason will be described why this arrangement is advantageous in preventing an image plane shift due to a variation in temperature at the cross section in the main scanning direction.

When the scanning lens is an fθ lens, from a relationship y'=fθ, the focal length f of the fθ lens is univocally determined to be a positive value from the angle of scanning and the angle of view. For example, in the case of an fθ lens for A3 size (the shorter side is 297 mm), the focal length f with the half angle of view θ as the parameter is as shown in Table 9.

TABLE 9

| Half angle of view (deg) | 15 | 20 | 25 | 30 | 35 | 40 | 45 |
|---|---|---|---|---|---|---|---|
| Focal length (mm) | 567 | 425 | 340 | 284 | 243 | 213 | 189 |

The scanning lens must be overall positive even if it includes a plurality of lens elements. Therefore, when the scanning lens includes a single lens having a negative refractive power, a positive lens such that the absolute value of its refractive power is greater than that of the refractive power of the negative lens should be included in the scanning lens.

With respect to the single lens, a relationship among the refractive index, the radii of curvature of the surfaces and the focal length will be examined. The focal length of the single lens is represented by the following expression (14):

$$\frac{1}{f} = (n-1)\left(\frac{1}{r1} - \frac{1}{r2}\right) \quad (14)$$

where f is the focal length of the single lens, n is the refractive index of the single lens, r1 is the radius of curvature of the light source side surface, and r2 is the radius of curvature of the image plane side surface.

In order to simplify the expression (14), a case will be considered where the positive lens is a plano-convex lens (f>0) and the negative lens is a plano-concave lens (f<0). When r is the radius of curvature of the spherical surfaces of each of the lenses, the focal length of the plano-convex lens is f=r/(n−1) and the focal length of the plano-concave lens is f=−r/(n−1). In either case, the absolute value |f| of the focal length increases with an increase in the radius of curvature r of the spherical surface and decreases with an increase in the refractive index n. Therefore, the absolute value of the refractive power increases with a decrease in the radius of curvature r of the spherical surface and increases with an increase in the refractive index n.

On the other hand, the variation in refractive index and in linear expansion according to the temperature differ between glass and resin. Table 10 shows a variation in refractive index dn/dT and a linear expansion coefficient (1/1)·(d1/dT) with respect to BK7 and AC which are examples of glass and resin, respectively. It is understood from Table 10 that resin is greater than glass in the linear expansion coefficient by one digit and in the variation in refractive index by two digits.

TABLE 10

| Lens material | $\frac{1}{1} \cdot \frac{d1}{dT}$ | $\frac{dn}{dT}$ |
|---|---|---|
| BK7 (Glass) | $7.8 \times 10^{-6}$ | $2.6 \times 10^{-6}$ |
| AC (Resin) | $7.0 \times 10^{-5}$ | $-1.07 \times 10^{-4}$ |

When the temperature varies, in glass, the variation in the radius of curvature r and the variation in the refractive index n compensate for the variation in the focal length f, whereas in resin, the variation in the radius of curvature r and the variation in the refractive index n multiply the variation in the focal length f. Therefore, comparing a glass lens and a resin lens having the same focal length f, the variation in the focal length f due to a variation in temperature is greater in the resin lens by far than in the glass lens.

Next, a relationship will be described between the absolute value of the refractive power and a variation in a back focal length Bf at the cross section in the main scanning direction when the lens elements included in the scanning lens are all made of resin. When the scanning lens is an fθ lens, the focal length f is represented by an expression (15) shown below. As is understood from the expression (15), if a width of scanning W and the half angle of view θ are determined, the focal length f of the fθ lens is univocally determined. That is, when the width of scanning W is constant, the greater the half angle of view θ is, the shorter the focal length f is (i.e. the greater the refractive power is).

$$f = \frac{90W}{\pi \cdot \theta} \quad (15)$$

where W is the width of scanning, θ is the half angle of view (deg), and f is the focal length.

Figure 9A:
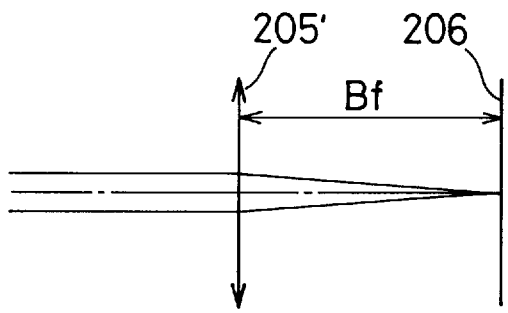
FIGS. 9A, 9B and 9C are views of assistance in explaining an effect on the back focal length in the present invention.

When the scanning lens 205' is an fθ lens as shown in FIG. 9A, since the fθ lens has a strong positive refractive power, if the refractive power varies due to a variation in temperature, the back focal length Bf varies accordingly. As described above, the greater the absolute value of the refractive power is, the more readily the back focal length Bf is affected by a variation in temperature. However, if the focal length f is increased in order to reduce the variation in the back focal length Bf due to a variation in temperature, the distance from the deflective reflection surface to the scanned surface (i.e. the total length of the laser scanning optical system) will increase. Thus, it is inadvisable to increase the focal length f.

Figure 9B:
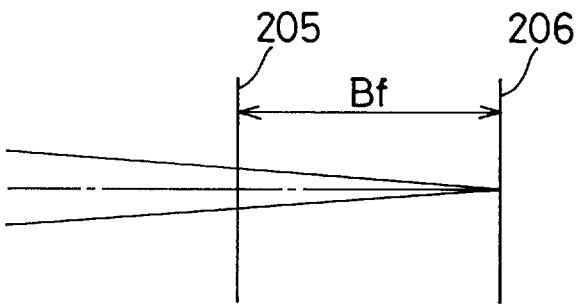

In a laser scanning optical system of a type in which converged light is incident on the scanning lens at the cross section in the main scanning direction, the refractive power of the scanning lens can be reduced without reference to the expression (15). Therefore, as shown in FIG. 9B, if a scanning lens 205 having a null refractive power in the main scanning direction is used, the variation in refractive power caused by a variation in temperature is extremely small since the refractive power is null. As a result, the variation in the back focal length Bf due to a variation in temperature is extremely small. Therefore, qualitatively, the greater the absolute value of the refractive power of the scanning lens is, the greater the variation in the back focal length Bf due to a variation in temperature is.

Figure 9C:
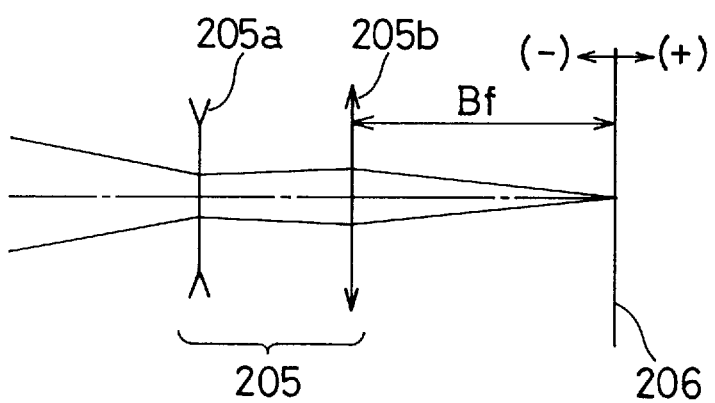

Next, a variation in the back focal length Bf due to a variation in temperature when the scanning lens includes a plurality of positive and negative resin lens elements at the cross section in the main scanning direction will be described. In an arrangement where the scanning lens 205 includes from the light source side a negative lens element 205a and a positive lens element 205b as shown in FIG. 9C, when the temperature rises, the absolute values of refractive powers of the lens elements 205a and 205b both decrease, so that the negative lens element 205a acts on the back focal length Bf so that the image plane returns toward the minus side and the positive lens element 205b acts so that the image plane retreats toward the plus side. Therefore, when the overall refractive power is positive like the fθ lens, the effect of retreating the image plane toward the plus side when the temperature rises increases and becomes dominant.

When positive and negative resin lens elements such that the absolute values of their refractive powers are close to each other are combined, the effect of returning the image plane toward the minus side by the negative lens element and the effect of retreating the image plane toward the plus side by the positive lens element are in equilibrium and compensate for each other. Therefore, in a scanning lens including a plurality of positive and negative resin lens elements at the cross section in the main scanning direction and the overall refractive power of which is substantially null in the main scanning direction, the variation in the back focal length Bf is minimized, so that the image shift due to a variation in temperature is prevented with respect to the main scanning direction.

Thus, since the lens elements included in the scanning lens of the present invention (corresponding to the second image forming optical system of Japanese Published Patent Application H4-47803) are all made of resin and the overall refractive power of the scanning lens is substantially zero at the cross section in the main scanning direction, the variation in focal length due to a variation in temperature does not occur in theory at the cross section in the main scanning direction, so that the position of the image plane hardly varies.

The refractive power φ which is substantially null is less than half the refractive power (=1/f) of the fθ lens. That is, it can be said that a refractive power is substantially null if the following condition (16) or (17) is fulfilled:

$$|\phi| < \frac{\pi \cdot \theta}{180W} \qquad (16)$$

$$\frac{180W}{\pi \cdot \theta} < f \qquad (17)$$

In the case of a scanning lens of subsequently shown embodiment and example for comparison, $$\frac{180W}{\pi \cdot \theta} = 633.2, \text{ and } f = 966.2$$

Therefore, the condition (17) is fulfilled.

Next, the temperature compensation in the sub-scanning direction will be described. As described previously, with respect to the cross section in the main scanning direction, since the overall refractive power of the resin-made scanning lens is null, the variation in back focal length due to a variation in temperature does not occur. With respect to the cross section in the sub-scanning direction, however, since the resin-made scanning lens has a strong positive power, the image plane shifts rearward (toward the plus side in FIG. 9C) as the temperature rises.

To solve this problem, in the present invention, the anamorphic lens having refractive power only at the cross section in the sub-scanning direction is formed of a negative resin lens element and a positive glass lens element so that the overall power is positive. With this arrangement, for example, the retreat of the image plane caused by the scanning lens when the temperature rises is canceled by the return of the image plane caused by the negative resin lens.

Figure 10A:
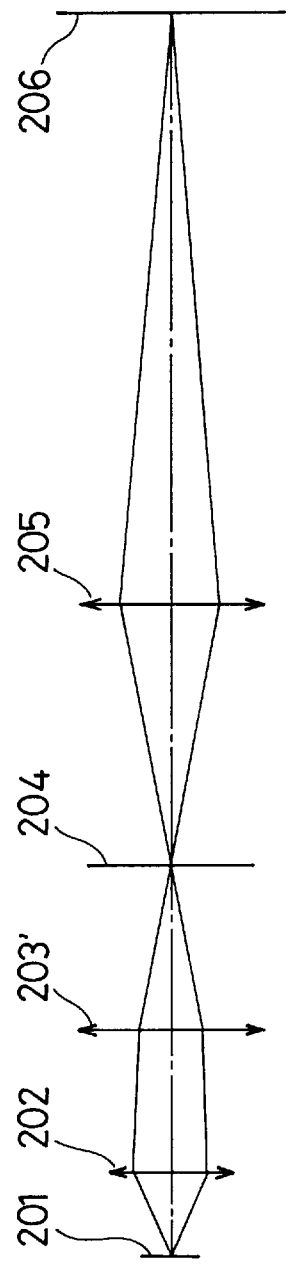
FIGS. 10A and 10B are cross-sectional views in the sub-scanning direction schematically showing the refractive power arrangement and optical path to explain temperature compensation by comparing a general laser scanning optical system and a laser scanning optical system of the present invention.
Figure 10B:
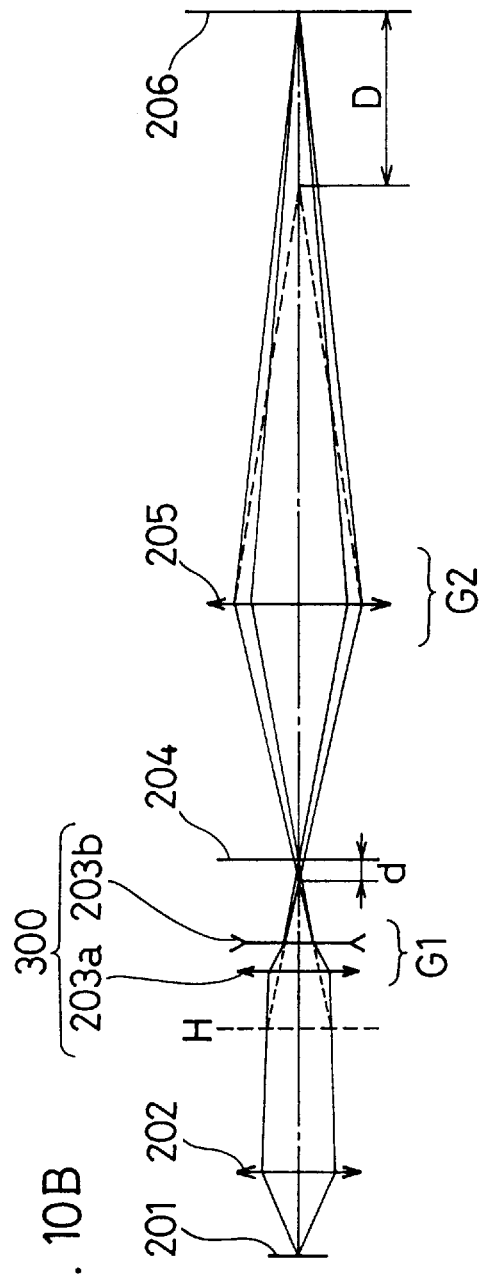

This will be described with reference to FIG. 10B. FIG. 10B shows the structure of the laser scanning optical system of the present invention at the cross section in the sub-scanning direction. FIG. 10A shows a general laser scanning optical system having the same total length as the laser scanning optical system of Fig. 10B (but having no temperature compensating function). First, with respect to the second cylindrical lens 203b FIG. 10B, when the temperature rises with the luminous flux imaged on the deflective reflecting surface 204, the absolute value of negative refractive power of the resin-made second cylindrical lens 203b decreases. For this reason, the imaging position shifts toward the side of the light source 201 by a distance d. The shift of the imaging position causes the image plane on the scanned surface 206 to shift toward the side of the light source 201 by the distance D. However, the absolute value of refractive power of the scanning lens 205 decreases due to the temperature rise as well as the refractive power of the second cylindrical lens 203b varies. For this reason, the shift of the image plane by the distance D is canceled and the position of the image plane is maintained on the scanned surface 206. Specifically, the variation in refractive power of the negative resin lens 203b which returns the image plane 206 toward the side of the light source 201 counteracts the variation in refractive power of the positive scanning lens 205 which retreats the image plane 206, whereby the shift of the image plane in the sub-scanning direction due to a variation in temperature is compensated for.

Figure 11A:
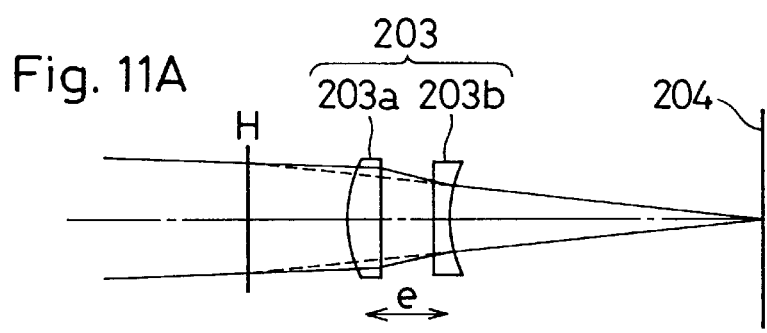
FIGS. 11A and 11B are views of assistance in explaining an effect on the lens arrangement of an anamorphic lens included in the present invention.

Next, a preferred lens arrangement and lens configuration of the anamorphic lens at the cross section in the sub-scanning direction will be described with reference to FIG. 11. FIG. 11 shows how the luminous flux having exited from the objective lens is imaged on the deflective reflection surface 204 by the anamorphic lens at the cross section in the sub-scanning direction. When the refractive power of the lens element disposed on the light source side is $\phi_1$ and the refractive power of the lens element disposed on the side of the deflective reflection surface 204 is $\phi_2$ and the overall refractive power is $\phi$, in an anamorphic lens of a positive, negative configuration from the light source side ($0<\phi_1$, $\phi_2<0$) as shown in FIG. 11A, $\phi=\phi_1+\phi_2-e\cdot\phi_1\cdot\phi_2$. In an anamorphic lens of a negative, positive configuration from the light source side ($\phi_1<0$, $0<\phi_2$) as shown in FIG. 11B, $\phi'=\phi_1'+\phi_2'-e'\cdot\phi_1'\cdot\phi_2'$.

Figure 11B:
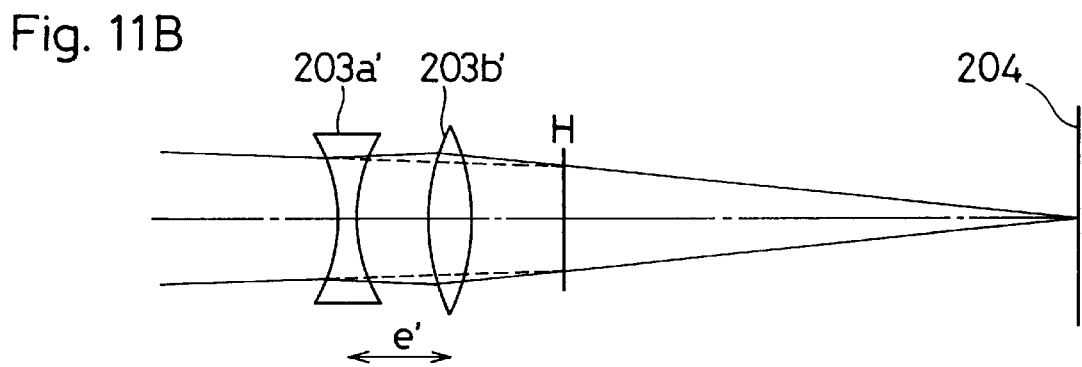

The image plane inclination correcting anamorphic lens 203 of the present invention may be of a positive, negative configuration from the light source side (FIG. 11A) or may be of a negative, positive configuration (FIG. 11B). However, the positive, negative configuration from the light source side is preferred. The reason therefor will be described in the following:

The Japanese Published Patent Application H4-47803 describes that disposing a negative cylindrical lens on the side of the light source 201 is advantageous in practical use since a long distance is secured before the line image. However, it cannot be advantageous in practical use that the anamorphic lens 203 which forms a line image is positioned away from the deflector. This is because the arrangement of the number of apertures (NA) in the entire optical system from the light source to the scanned surface at the cross sections in the main and sub-scanning directions is ignored and only the paraxial refractive power arrangement is considered. For example, although it is necessary to consider the length-to-width ratio of the radiation angle characteristic of a semiconductor laser serving as the light source and the magnification of the scanning lens at the cross section in the sub-scanning direction, if these are actually considered, the NA becomes too dark at the cross section in the sub-scanning direction, so that no optical system can be formed unless most of the luminous flux is cut off at an aperture or the cylindrical lens is disposed considerably away from the deflector. In view of any aspect such as the size reduction of the laser scanning optical system, the brightness of the NA at the cross section in the sub-scanning direction and the mechanical strength of the light source portion in realizing a multi-beam light source, it is advantageous that the distance from the cylindrical lens to the deflector is short.

The magnification of the scanning lens which maintains the deflective reflection surface and the scanned surface in a conjugate relationship at the cross section in the sub-scanning direction is normally 3× to 4×. If the magnification is as low as 1×, the focal length of the anamorphic lens increases, so that the distance from the light source to the deflective reflection surface increases. However, if the anamorphic lens is of the positive, negative configuration from the light source side (FIG. 11A), the principal point H shifts frontward (toward the light source side), so that the distance from where the lens is actually positioned to the deflective reflection surface 4 is shorter than the focal length. Therefore, disposing the positive glass lens element on the light source side and the negative resin lens element on the deflector side is more effective in reducing the optical path and enables the image plane inclination correction at a low magnification and the size reduction of the laser scanning optical system.

On the other hand, when the anamorphic lens is of the negative, positive configuration from the light source side as shown in Japanese Published Patent Application H4-47803, since the principal point H shifts rearward (toward the deflective surface side), the distance from where the cylindrical lens is positioned to the deflective reflection surface 204 is longer than the actual focal length.

In either of the above-described cases, the positive glass lens element may be a bi-convex lens, a plano-convex lens or a meniscus lens. Likewise, the negative resin lens element may be a bi-concave lens, a plano-concave lens or a meniscus lens.

The image plane inclination correcting anamorphic lens may be formed of a combination of single lenses such as a combination of a positive plano-convex lens and a negative plano-concave lens or a combination of a positive bi-convex lens and a negative bi-concave lens such that the radius of curvature is the same on the both side surfaces. Moreover, the anamorphic lens may be formed of a combination of lenses having different radii of curvature, respectively, so that aberration of the scanning lens is corrected at the cross section in the sub-scanning direction. This arrangement is advantageous, particularly, for use in a laser scanning optical system which supports high print density, and is suitable for use in a laser beam printer with a high record density.

According to such features, since the overall refractive power of the scanning lens is substantially null in the main scanning direction, the image plane does not shift at the cross section in the main scanning direction even if the temperature varies. On the other hand, at the cross section in the sub-scanning direction, the image plane shift caused by a variation in the temperature of the scanning lens is compensated for by the image plane shift caused by a variation in the temperature of the negative resin lens included in the image plane inclination correcting anamorphic lens. In addition, since the positive glass lens included in the anamorphic lens is hardly affected by a variation in temperature, a variation in its temperature does not affect the position of the image plane.

Hereinafter, an embodiment of the laser scanning optical system according to the second implementation of the present invention and an example for comparison with the embodiment will be described. First, numerical data of the embodiment (temperature compensation is made) and the example for comparison (temperature compensation is not made) are shown with respect to before and after a variation in temperature. In the embodiment and the example for comparison, Si (i=1,2,3, . . . ) represents an ith surface counted from the laser source side, ri (i=1,2,3, . . . ) represents the radius of curvature, in the main scanning direction, of an ith surface counted from the laser source side (with respect to rotationally symmetrical surfaces, the radius of curvature in the sub-scanning direction is also shown), di (i=1,2,3, . . . ) represents the axial distance between an ith surface and an i+1th surface counted from the laser source side, and Ni (i=1,2,3, . . . ) represents the refractive index, to light of a wavelength of 780 nm, of an ith lens counted from the laser source side. $f_1$ represents the focal length of the first cylindrical lens 203a. $f_2$ is the focal length of the second cylindrical lens 203b. $f_A$ is the focal length of the image plane inclination correcting anamorphic lens 203 or 203' (in the case of the embodiment, the composite focal length of the first and second cylindrical lenses 203a and 203b).

In the embodiment and the example for comparison, the deflective reflection surface 204 side surface of a fourth scanning lens g4 included in the scanning lens 205 is a toric surface having different refractive powers in the main and sub-scanning directions. Taking a deformed toric surface as an example, a Z toric surface of the fourth scanning lens g4 will be described. This surface is a toric surface such that its main scanning direction cross section is aspherical and the radius of curvature in the sub-scanning direction continuously changes along the main scanning direction cross section. This surface is defined as a function of y and z by the following expression (A):

$$x = \kappa \cdot \frac{y^2}{1 + (1 - \mu \cdot \kappa^2 \cdot y^2)^{\frac{1}{2}}} + \rho + A \quad (A)$$

Here, $$\kappa = \frac{K}{1 - K \cdot \rho} \quad (B)$$

$$\rho = c \cdot \frac{z^2}{1 + (1 - \epsilon \cdot c^2 \cdot z^2)^{\frac{1}{2}}} \quad (C)$$

That is, the deformed Z toric surface is obtained as a reference z toric surface to which a two-dimensional additive term A(y,z) is added. Here, when a main curve is a curve at the cross section in the main scanning direction and a profile curve is a curve at the cross section in the sub-scanning direction (i.e. x direction is the direction along the optical axis, y direction is the main scanning direction, and z direction is the sub-scanning direction), K and c are curvatures (exactly, $K+2a_{0,2}$ and $c+2a_{2,0}$, respectively) at the vertices along the main and profile curves, respectively (i.e. 1/K is the radius of curvature at the vertex along the main curve and 1/c is the radius of curvature along the profile curve (radius of curvature in the sub-scanning direction at the vertex of the main curve)), and $\mu$ and $\in$ are conic constants (hyperbola when negative, parabola when zero, ellipse when positive, circle when 1) along the main and profile curves, respectively.

For example, when $\mu=1$ and A=0, the expression (A) represents a conventional toric surface (secondary profile curve $\rho$ rotated with a radius of 1/K about an axis parallel to the Z axis). A of the expression (A) is expressed by the following expression:

$$A = \sum_{i=0}^{16} \left[ \sum_{j=0}^{8} a_{i,j} \cdot |y|^j \right] \cdot |z|^i$$

where $a_{0,0} \equiv 0$, $a_{i,1} \equiv 0$, and $a_{1,j} \equiv 0$.

In each table (Tables 10 to 13), the surfaces marked with asterisks are rotationally symmetrical aspherical surfaces and defined by the following expression representing the surface configuration of an aspherical surface:

$$X = \frac{C \cdot Y^2}{1 + (1 - \epsilon \cdot Y^2 \cdot C^2)^{\frac{1}{2}}} + \sum_i A i Y^i$$

where X is a displacement amount along the optical axis from a reference surface, Y is a height in a direction vertical to the optical axis, C is a paraxial curvature, $\in$ is a conic constant, and Ai is an ith aspherical coefficient (i=4,6,8,10).

Data obtained from the present implementation before temperature variation (temperature: 20° C.) are listed in Table 11.

Data obtained from the present implementation after temperature variation (temperature: 40°) are listed in Table 12.

Data obtained from an example for comparison before temperature variation (temperature: 20° C.) are listed in Table 13.

Data obtained from an example for comparison after temperature variation (temperature: 40° C.) are listed on Table 14.

TABLE 11

| Surface | Radius of Curvature in Main Scanning Direction | Axial Distance | Refractive Index |
|---|---|---|---|

[Image plane inclination correcting anamorphic lens 203: $f_A = 150$]
(1st cylindrical lens 203a, made of glass: f1 = 14)
S1  r1  ∞ (Radius of curvature in sub-scanning direction: 7.1564)
        d1 2.000    N1 1.51118
S2  r2 ∞  d2 2.95108
(2nd cylindrical lens 203b, made of resin: $f_2$ = 31 10)
S3  r3 ∞  d3 1.0000  N2 1.51882
S4  r4 ∞  (Radius of curvature in sub-scanning direction: 5.1883)
        d4 64.420
[Deflective reflection surface 204]
S5  r5 ∞  d5 35.000
[Scanning lens 205]
(1st scanning lens g1)
S6  r6 ∞  d4 4.000  N2 1.51882
S7  r7 243.76391  d5 32.000
(2nd scanning lens g2)
S8  r8 −1070.40022  d6 8.000  N3 1.51882
S9  r9 −201.24004  d7 37.000
(3rd scanning lens g3)
S10* r10 297.19625  d8 8.000  N4 1.51882
S11* r11 559.69732  d9 70.000
(4th scanning lens g4)
S12  r12 ∞  (Radius of curvature in sub-scanning direction: 49.20499)
        d10 5.000  N5 1.51882
S13  r13 ∞  d11 168.855
[Scanned surf ace 206]
S14  r14 ∞
Aspherical Data of
Rotationally Symmetrical Aspherical Surfaces
  S10:  $\epsilon$ = 1.0000
     A4 = −0.14046825 × 10$^{-6}$
     A6 = 0.58736024 × 10$^{-12}$

TABLE 11-continued

| Surface | Radius of Curvature in Main Scanning Direction | Axial Distance | Refractive Index |
|---|---|---|---|

A8 = 0.15081803 × 10$^{-15}$
     A10 = −0.23871994 × 10$^{-20}$
  S11:  $\epsilon$ = 1.0000
     A4 = −0.16365933 × 10$^{-6}$
     A6 = 0.23075207 × 10$^{-12}$
     A8 = −0.14396003 × 10$^{-15}$
     A10 = 0.11999272 × 10$^{-19}$
Aspherical Data of
Rotationally Asymmetrical Aspherical Surface
  S12: Z toric surface
     $\epsilon$ = 1.0000
     1/c = 49.20499
     p = 1.0000
     1/K = ∞
     $a_{2,2}$ = −0.23 × 10$^{-6}$
     $a_{2,4}$ = 0.61 × 10$^{-11}$

TABLE 12

| Surface | Radius of Curvature in Main Scanning Direction | Axial Distance | Refractive Index |
|---|---|---|---|

[Image plane inclination correcting anamorphic lens 203: $f_A$ = 150]
(1st cylindrical lens 203a, made of glass: f1 = 14)
S1  r1  ∞ (Radius of curvature in sub-scanning direction: 7.1564)
        d1 2.000    N1 1.51123
S2  r2 ∞  d2 2.95108
(2nd cylindrical lens 203b, made of resin: $f_2$ = 31 10)
S3  r3 ∞  d3 1.0000  N2 1.51668
S4  r4 ∞  (Radius of curvature in sub-scanning direction: 5.1883)
        d4 64.420
[Deflective reflection surface 204]
S5  r5 ∞  d5 35.000
[Scanning lens 205]
(1st scanning lens g1)
S6  r6 ∞  d4 4.000  N2 1.51668
S7  r7 244.10518  d5 32.000
(2nd scanning lens g2)
S8  r8 −1071.89878  d6 8.000  N3 1.51668
S9  r9 −201.52178  d7 37.000
(3rd scanning lens g3)
S10* r10 297.61233  d8 8.000  N4 1.51668
S11* r11 559.69732  d9 70.000
(4th scanning lens g4)
S12  r12 ∞  (Radius of curvature in sub-scanning direction: 49.27388)
        d10 5.000  N5 1.51668
S13  r13 ∞  d11 168.855
[Scanned surf ace 206]
S14  r14 ∞
Aspherical Data of
Rotationally Symmetrical Aspherical Surfaces
  S10:  $\epsilon$ = 1.0000
     A4 = −0.13987993 × 10$^{-6}$
     A6 = 0.58326593 × 10$^{-12}$
     A8 = 0.14934826 × 10$^{-15}$
     A10 = −0.23573302 × 10$^{-20}$
  S11:  $\epsilon$ = 1.0000
     A4 = −0.16297388 × 10$^{-6}$
     A6 = 0.22914357 × 10$^{-12}$
     A8 = −0.14255709 × 10$^{-15}$
     A10 = 0.11849134 × 10$^{-19}$
Aspherical Data of
Rotationally Asymmetrical Aspherical Surface
  S12: Z toric surface
     $\epsilon$ = 1.0000
     1/c = 49.27388

TABLE 12-continued

| Surface | Radius of Curvature in Main Scanning Direction | Axial Distance | Refractive Index |
|---|---|---|---|
| | p = 1.0000 | | |
| | 1/K = ∞ | | |
| | $a_{2,2}$ = −0.23 × $10^{-6}$ | | |
| | $a_{2,4}$ = 0.61 × $10^{-11}$ | | |

TABLE 13

| Surface | Radius of Curvature in Main Scanning Direction | Axial Distance | Refractive Index |
|---|---|---|---|
| Image plane inclination correcting anamorphic lens 203 cylindrical lens), made of glass: $f_A$ = 150 | | | |
| S1 | r1 ∞ | (Radius curvature in b-scanning direction: 76.6772) | |
| | | d1 5.000 | N1 1.51118 |
| S2 | r2 ∞ | d2 112.5 | |
| [Deflective reflection surface, 204] | | | |
| S3 | r3 ∞ | d3 35.000 | |
| [Scanning lens 205] | | | |
| (1st scanning lens g1) | | | |
| S4 | r4 ∞ | d4 4.000 | N2 1.51882 |
| S5 | r5 243.76391 | d5 32.000 | |
| (2nd scanning lens g2) | | | |
| S6 | r6 −1070.40022 | d6 8.000 | N3 1.51882 |
| S7 | r7 −201.24004 | d7 37.000 | |
| (3rd scanning lens g3) | | | |
| S8* | r8 297.19625 | d8 8.000 | N4 1.51882 |
| S9* | r9 559.69732 | d9 70.000 | |
| (4th canning lens g4). | | | |
| S10 | r10 ∞ | (Radius of curvature in sub-scanning direction: 49.20499) | |
| | | d10 5.000 | N5 1.51882 |
| S11 | r11 ∞ | d11 168.855 | |
| [Scanned surface 206] | | | |
| S12 | r12 ∞ | | |
| Aspherical Data of Rotationally Symmetrical Aspherical Surfaces | | | |
| S8: | δ = 1.000 | | |
| | A4 = −0.14046825 × $10^{-6}$ | | |
| | A6 = 0.58736024 × $10^{-12}$ | | |
| | A8 = 0.15081803 × $10^{-15}$ | | |
| | A10 = −0.23871994 × $10^{-20}$ | | |
| S9: | δ = 1.0000 | | |
| | A4 = −0.16365933 × $10^{-6}$ | | |
| | A6 = 0.23075207 × $10^{-12}$ | | |
| | A8 = −0.14396003 × $10^{-15}$ | | |
| | A10 = 0.11999272 × $10^{-19}$ | | |
| Aspherical Data of Rotationally Asymmetrical As#herical Surface | | | |
| S10: | Z toric surface | | |
| | δ = 1.000 | | |
| | 1/c = 49.20499 | | |
| | p = 1.0000 | | |
| | 1/K = ∞ | | |
| | $a_{2,2}$ = −0.23 × $10^{-6}$ | | |
| | $a_{2,4}$ = 0.61 × $10^{-11}$ | | |

TABLE 14

| Surface | Radius of Curvature in Main Scanning Direction | Axial Distance | Refractive Index |
|---|---|---|---|
| Image plane inclination correcting anamorphic lens 203' cylindrical lens), made of glass: $f_A$ = 150 | | | |
| S1 | r1 ∞ | (Radius curvature in b-scanning direction: 76.6772) | |
| | | d1 5.000 | N1 1.51123 |

TABLE 14-continued

| Surface | Radius of Curvature in Main Scanning Direction | Axial Distance | Refractive Index |
|---|---|---|---|
| S2 | r2 ∞ | d2 112.5 | |
| [Deflective reflection surface, 204] | | | |
| S3 | r3 ∞ | d3 35.000 | |
| [Scanning lens 205] | | | |
| (1st scanning lens g1) | | | |
| S4 | r4 ∞ | d4 4.000 | N2 1.51668 |
| S5 | r5 243.76391 | d5 32.000 | |
| (2nd scanning lens g2) | | | |
| S6 | r6 −1071.89878 | d6 8.000 | N3 1.51668 |
| S7 | r7 −201.24004 | d7 37.000 | |
| (3rd scanning lens g3) | | | |
| S8* | r8 −201.52178 | d8 8.000 | N4 1.51668 |
| S9* | r9 559.69732 | d9 70.000 | |
| (4th canning lens g4) | | | |
| S10 | r10 ∞ | (Radius of curvature in sub-scanning direction: 49.27388) | |
| | | d10 5.000 | N5 1.51668 |
| S11 | r11 ∞ | d11 168.855 | |
| [Scanned surface 206] | | | |
| S12 | r12 ∞ | | |
| Aspherical Data of Rotationally Symmetrical Aspherical Surfaces | | | |
| S8: | δ = 1.000 | | |
| | A4 = −0.13987993 × $10^{-6}$ | | |
| | A6 = 0.58326593 × $10^{-12}$ | | |
| | A8 = 0.14934826 × $10^{-15}$ | | |
| | A10 = −0.23573302 × $10^{-20}$ | | |
| S9: | δ = 1.0000 | | |
| | A4 = −0.16297388 × $10^{-6}$ | | |
| | A6 = 0.22914357 × $10^{-12}$ | | |
| | A8 = −0.14255709 × $10^{-15}$ | | |
| | A10 = 0.11849134 × $10^{-19}$ | | |
| Aspherical Data of Rotationally Asymmetrical Aspherical Surface | | | |
| S10: | Z toric surface | | |
| | δ = 1.000 | | |
| | 1/c = 49.27388 | | |
| | p = 1.0000 | | |
| | 1/K = ∞ | | |
| | $a_{2,2}$ = −0.23 × $10^{-6}$ | | |
| | $a_{2,4}$ = 0.61 × $10^{-11}$ | | |

Figure 12:
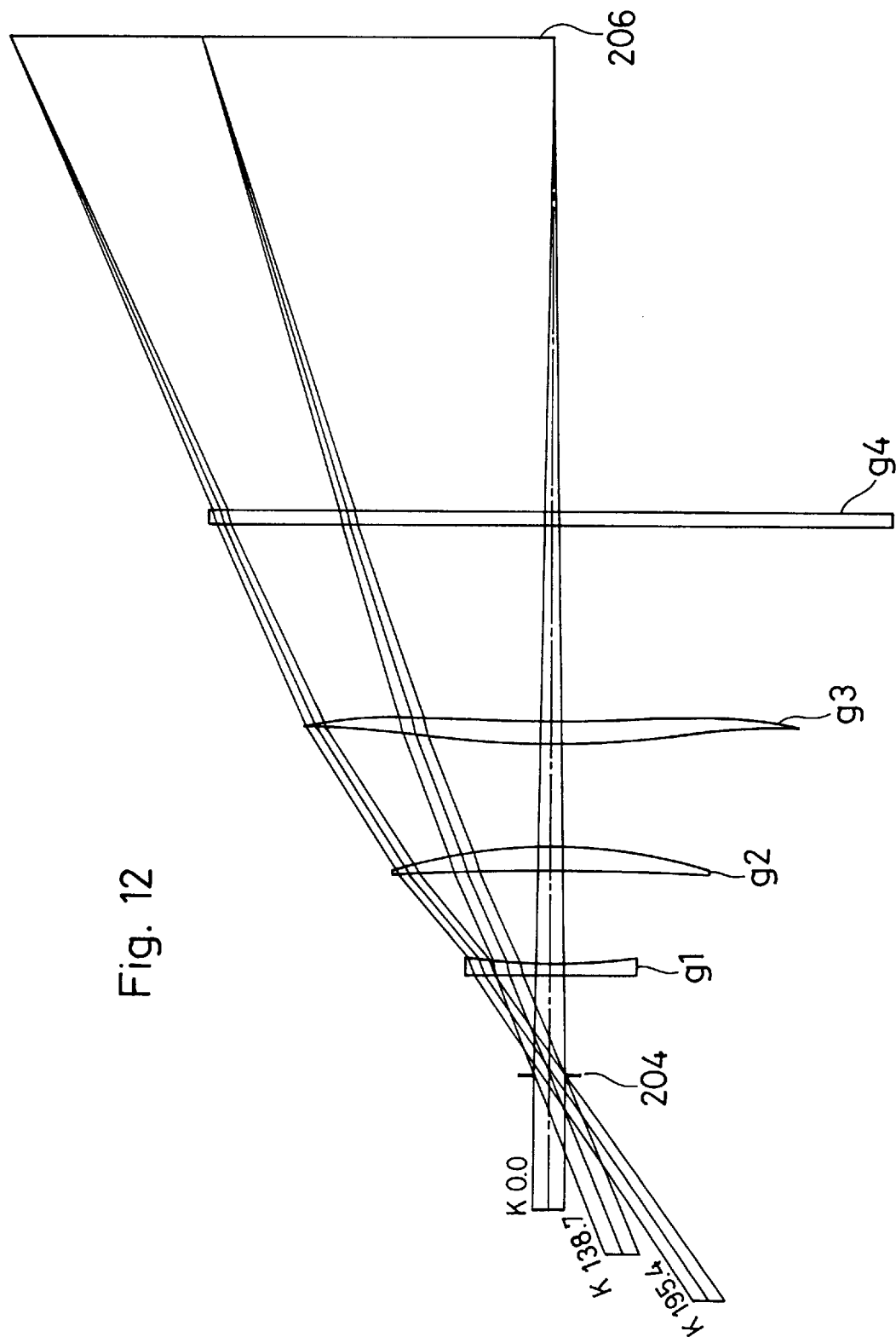
FIG. 12 is a cross-sectional view in the main scanning direction showing the lens arrangement and optical path from a deflective reflection surface to a scanned surface in an embodiment of the present invention and an example for comparison with the embodiment.
Figure 13:
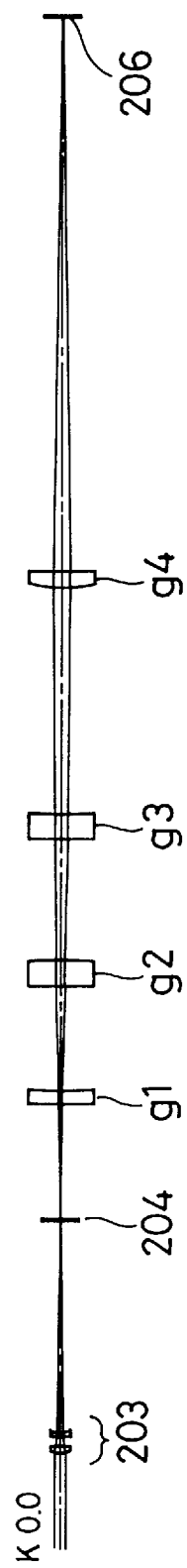
FIG. 13 is a cross-sectional view in the sub-scanning direction showing the lens arrangement and optical path from the anamorphic lens to the scanned surface in the embodiment of the present invention.
Figure 14:
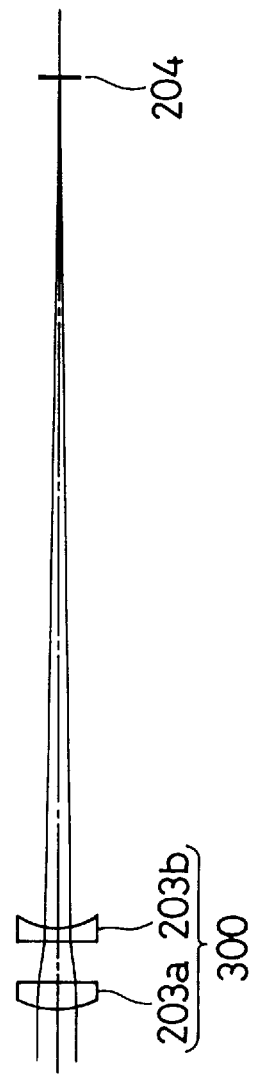
FIG. 14 is a cross-sectional view in the sub-scanning direction showing the lens arrangement and optical path from the anamorphic lens to the deflective reflection surface in the embodiment of the present invention.
Figure 15:
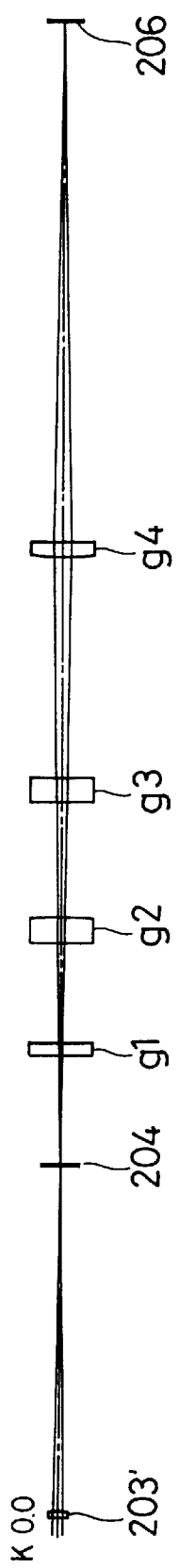
FIG. 15 is a cross-sectional view in the sub-scanning direction showing the lens arrangement and optical path from the anamorphic lens to the scanned surface in the example for comparison.
Figure 16:
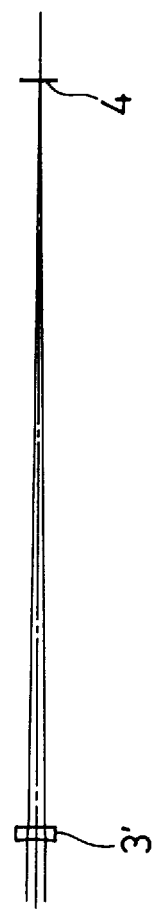
FIG. 16 is a cross-sectional view in the sub-scanning direction showing the lens arrangement and optical path from the anamorphic lens to the deflective reflection surface in the example for comparison.

FIG. 12 cross-sectionally shows the lens arrangement and optical path from the deflective reflection surface 204 to the scanned surface 206 of the embodiment and the example for comparison with respect the main scanning direction. Reference designation K at the optical path represents a beam with an angle of view (angle of deflection) θ and expressed by K=S1 (distance from the deflective reflection surface to the object surface)×sinθ. FIG. 13 cross-sectionally shows the lens arrangement and optical path from the anamorphic lens 203 to the scanned surface 206 in the embodiment with respect to the sub-scanning direction. FIG. 14 cross-sectionally shows the lens arrangement and optical path from the anamorphic lens 203 to the deflective reflection surface 204 in the embodiment with respect to the sub-scanning direction. FIG. 15 cross-sectionally shows the lens arrangement and optical path from the anamorphic lens 203' to the scanned surface 206 in the example for comparison with respect to the sub-scanning direction. FIG. 16 cross-sectionally shows the lens arrangement and optical path from the anamorphic lens 203' to the deflective reflection surface 204 in the example for comparison with respect to the sub-scanning direction.

In the data of the embodiment and the example for comparison, the scanning lens 205 is common and the first to third scanning lenses g1 to g3 thereof include rotationally symmetrical surfaces (therefore, the radii of curvature in the main and sub-scanning directions are the same). The focal length of the single glass-made cylindrical lens 203' used in the example for comparison is 150 mm. Likewise, the composite focal length of the first cylindrical lens 203a having a positive refractive power and made of glass and the second cylindrical lens 203b having a negative refractive power and made of resin used in the embodiment is set to be 150 mm.

If the combination of focal lengths of the first and second cylindrical lenses 203a and 203b having positive and negative refractive powers, respectively, is changed, the degree of effect of the temperature variation on the variation in the back focal length of the negative, resin-made second cylindrical lens 203b is changed, so that the condition for the temperature compensation is not fulfilled. However, the combination of focal lengths of the positive (glass) and negative (resin) first and second cylindrical lenses 203a and 203b fulfilling the condition for the temperature compensation exists continuously and innumerably. That is, in a graph with the longitudinal axis representing the focal length $f_1$ and the lateral axis representing the focal length $f_2$, a continuous curve is obtained by plotting the points fulfilling the condition for the temperature compensation.

The variation in the back focal length Bf at the main and sub-scanning direction cross sections before and after a temperature variation in the example for comparison and in the embodiment is summarized as shown in Tables 14 and 15.

TABLE 14

Embodiment (Temperature Compensation Is Made)
Anamorphic Lens Includes
positive Glass Lens and Negative Resin Lens

|  | 20° C. (Before variation) | 40° C. (After variation) | Variation |
|---|---|---|---|
| Main scanning direction | 0.0046 | 0.2185 | 0.2139 |
| Sub scanning direction | 0.3976 | 0.4955 | 0.0979 |

TABLE 15

Example for Comparison (Temperature Compensation Is Not Made)
Anamorphic Lens Includes One positive Glass Lens

|  | 20° C. (Before variation) | 40° C. (After variation) | Variation |
|---|---|---|---|
| Main scanning direction | 0.0001 | 0.2147 | 0.2146 |
| Sub scanning direction | 0.4729 | 2.3029 | 1.8300 |

With respect to the main scanning direction, since the refractive power is null both in the embodiment and the example for comparison as described above, the variation is as small as approximately 0.21 mm. With respect to the sub-scanning direction, while the variation is as great as 1.83 mm in the example for comparison, the variation is as small as 0.0979 mm in the embodiment. Thus, it should be understood that the temperature compensation is effectively made in the embodiment.

What is claimed is:

1. A scanning optical apparatus, comprising:
   a light source;
   a deflector for deflecting a light beam emitted from the light source to a main scanning direction;
   a first imaging unit, including a first resin lens having a negative refractive power only in a sub-scanning direction perpendicular to the main scanning direction, for making the light beam emitted from the light source form an image in the vicinity of the deflection position of said deflector in the sub-scanning direction; and
   a second imaging unit, including a second resin lens having a positive refractive power only in the sub-scanning direction, for making the light beam deflected by the deflector form an image on a scanned surface in the sub-scanning direction wherein said first resin lens and said second resin lens compensate for variation in each other's refractive power due to temperature changes.

2. A scanning optical apparatus as claimed in claim 1, wherein said first imaging unit includes, from the light source, a glass lens having a positive refractive power only in the sub-scanning direction and said first resin lens.

3. A scanning optical apparatus as claimed in claim 1, wherein said second imaging unit includes, from the light source, a glass lens having a negative refraction power, a glass lens having a positive refractive power and said second resin lens.

4. A scanning optical apparatus as claimed in claim 1, wherein a collimated light beam is incident on said deflector.

5. A scanning optical apparatus, comprising:
   a light source;
   an objective lens unit for condensing a light beam emitted from said light source;
   a first imaging unit for converging the light beam having passed through said objective lens unit in a sub-scanning direction;
   a deflector arranged at or in the vicinity of an image formation position of the light beam having passed through said first imaging unit; and
   a second imaging unit for making the light beam deflected by said deflector to form an image on a scanned surface, and for maintaining a conjugate relation between said reflector and said scanned surface in a sub-scanning section,
   wherein said objective lens unit condenses the light beam from said light source so that the condensed light beam is directed to said second imaging unit in a main scanning direction,
   wherein said first imaging unit, having a refractive power only in the sub-scanning direction, comprising a glass lens having a positive refractive power in the sub-scanning direction and a resin lens having a negative refractive power in the sub-scanning direction, has as a whole a positive refractive power in the sub-scanning direction,
   wherein all lens components in said second imaging unit are made of resin, an overall refractive power thereof in the main scanning direction being substantially null, and
   wherein the resin lens of the first imaging unit compensates for variations in the refractive power of said resin lens of said second imaging unit.

6. A scanning optical apparatus as claimed in claim 5, wherein said first imaging unit includes, from the light source, a glass lens having a positive refractive power only in the sub-scanning direction and said resin lens.

7. A scanning optical apparatus as claimed in claim 5, wherein said second imaging unit includes a rotation-symmetric lens and a lens having a refractive power only in the sub-scanning direction.

8. A scanning optical apparatus, comprising:

a light source;

an objective lens unit for condensing a light beam emitted from said light source;

a first imaging unit, including a first resin lens having a negative refractive power in a sub-scanning direction yet having no refractive power in a main scanning direction, for making the light beam having passed through said first imaging unit converge in the sub-scanning direction;

a deflector arranged at or in the vicinity of an image formation position of the light beam having passed through said first imaging unit;

a second imaging unit, including a second resin lens having a positive refractive power in the sub-scanning direction yet having no refractive power in the main scanning direction, for making the light beam deflected by said deflector form an image on a scanned surface, and for maintaining a subjugate relation between said deflector and said scanned surface in a sub-scanning section wherein said first resin lens and said second resin lens compensate for variation in each other's refractive power due to temperature changes.

9. A scanning optical apparatus as claimed in claim 8, wherein said first imaging unit includes, from the light source, a glass lens having a positive refractive power only in the sub-scanning direction and said first resin lens.

10. A scanning optical apparatus as claimed in claim 8, wherein said second imaging unit includes, from the light source, a glass lens having a negative refractive power, a glass lens having a positive refractive power and said second resin lens.

11. A scanning optical apparatus as claimed in claim 8, wherein a collimated light beam is incident on said deflector.

12. A scanning optical apparatus as claimed in claim 8, wherein all lens components in said second imaging unit is made of resin.

13. A scanning optical apparatus as claimed in claim 8, wherein a converging light beam is incident on said deflector.

* * * * *